US012423384B2

(12) United States Patent
Wang et al.

(10) Patent No.: US 12,423,384 B2
(45) Date of Patent: Sep. 23, 2025

(54) NOISE TOLERANT ENSEMBLE RCNN FOR SEMI-SUPERVISED OBJECT DETECTION

(71) Applicant: Google LLC, Mountain View, CA (US)

(72) Inventors: Jiang Wang, Santa Clara, CA (US); Jiyang Gao, Dublin, CA (US); Shengyang Dai, San Jose, CA (US); Jia Li, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 702 days.

(21) Appl. No.: 17/437,238

(22) PCT Filed: Mar. 8, 2019

(86) PCT No.: PCT/US2019/021375
§ 371 (c)(1),
(2) Date: Sep. 8, 2021

(87) PCT Pub. No.: WO2020/185198
PCT Pub. Date: Sep. 17, 2020

(65) Prior Publication Data
US 2022/0172456 A1    Jun. 2, 2022

(51) Int. Cl.
*G06K 9/00*    (2022.01)
*G06F 18/2413*    (2023.01)
(Continued)

(52) U.S. Cl.
CPC ...... *G06F 18/24133* (2023.01); *G06V 10/764* (2022.01); *G06V 10/84* (2022.01)

(58) Field of Classification Search
CPC .......... G06N 3/045; G06N 3/08; G06N 3/048; G06N 3/065; G06N 3/049; G06N 3/044; G06N 3/063; G06N 20/00; G06N 3/084; G06N 3/082; G06N 5/02; G06N 3/04; G06N 7/01; G06N 20/10; G06N 3/0464;
(Continued)

(56) References Cited

U.S. PATENT DOCUMENTS

2012/0123978 A1*  5/2012  Toderice ................ G06V 20/70
706/12

OTHER PUBLICATIONS

Gao, NOTE-RCNN: NOise Tolerant Ensemble RCNN for Semi-Supervised Object Detection, arXiv, 2018 (Year: 2018).*
K. Zhao, J. Kang, J. Jung and G. Sohn, "Building Extraction from Satellite Images Using Mask R-CNN with Building Boundary Regularization," 2018 IEEE/CVF Conference on Computer Vision and Pattern Recognition Workshops (CVPRW), Salt Lake City, UT, USA, 2018, pp. 242-2424 (Year: 2018).*
He "Mask R-CNN," arXiv, Jan. 24, 2018 (Year: 2018).*
(Continued)

*Primary Examiner* — Alex Kok S Liew
(74) *Attorney, Agent, or Firm* — DORITY & MANNING P.A.

(57) ABSTRACT

The present disclosure provides systems and methods that include or otherwise leverage an object detection training model for training a machine-learned object detection model. In particular, the training model can obtain first training data and train the machine-learned object detection model using the first training data. The training model can obtain second training data and input the second training data into the machine-learned object detection model, and receive as an output of the machine-learned object detection model, data that describes the location of a detected object of a target category within images from the second training data. The training model can determine mined training data based on the output of the machine-learned object detection model, and train the machine-learned object detection model based on the mined training data.

20 Claims, 12 Drawing Sheets

(51) Int. Cl.
*G06V 10/764* (2022.01)
*G06V 10/84* (2022.01)

(58) Field of Classification Search
CPC ........ G06N 3/02; G06N 3/0442; G06N 3/047;
G06N 3/0455; G06N 3/0495; G06N 5/04;
G06N 3/088; G06N 3/10; G06N 5/046;
G06N 10/00; G06N 10/40; G06N 10/70;
G06N 20/20; G06N 3/002; G06N 3/06;
G06N 3/0675; G06N 3/123; G06N 5/01
See application file for complete search history.

(56) References Cited

OTHER PUBLICATIONS

International Preliminary Report on Patentability for Application No. PCT/US2019/021375, mailed Sep. 23, 2021, 11 pages.
Goa et al., "NOTE-RCNN: Noise Tolerant Ensemble RCNN for Semi-Supervised Object Detection", arxiv.org, Cornell University Library, Dec. 1, 2018, 10 pages.
International Search Report for Application No. PCT/US2019/021375, mailed on Nov. 22, 2019, 2 pages.
Uijlings et al., "Revisiting Knowledge Transfer for Training object Class Detectors", arxiv.org, Cornell University Library, Aug. 21, 2017, 10 pages.

* cited by examiner

NOISE TOLERANT ENSEMBLE RCNN FOR SEMI-SUPERVISED OBJECT DETECTION

FIELD

The present disclosure relates generally to determining object classes and their bounding shapes. More particularly, the present disclosure relates to training an object detection model to perform semi-supervised object detection in which a few seed shape-level labels and a large set of image-level labels are used for training the object detection model.

BACKGROUND

With the recent advances in deep learning, modern object detectors, such as Faster RCNN (regional-based convolution neural network), YOLO, SSD, and RetinaNet, are reliable in determining both object classes and their bounding shapes. However, the application of deep learning-based detectors is still limited by the efforts of collecting bounding shape training data. These detectors are trained with huge amounts of manually labelled bounding shapes. In the real world, each application may require a unique set of detected categories. Manually labeling huge amounts (e.g., tens of thousands) of object bounding shapes for each application is expensive and time-consuming.

Thus, the cost of labeling large numbers of bounding shapes is one of the main challenges for training modern object detectors. To reduce the effort of labelling bounding shapes, certain researchers have worked on training object detectors with only image-level labels, which are substantially cheaper to annotate, or even free with image search engines; this task is called weakly supervised object detection. The Multiple Instance Learning (MIL) based training-mining pipeline is widely used for this task; however, the resulting detectors perform considerably worse than the fully supervised counterparts. For example, a detector learned with only image-level labels often performs poorly in localization, and it may focus on the object part, but not the whole object. As another example, without an accurate detector, object instances cannot be mined correctly, especially when the scene is complicated.

SUMMARY

Aspects and advantages of embodiments of the present disclosure will be set forth in part in the following description, or can be learned from the description, or can be learned through practice of the embodiments.

A first example aspect of the present disclosure is directed to a computer-implemented method for training a machine-learned object detection model. The method includes obtaining, by one or more computing devices, first training data comprising one or more first images, wherein each of the one or more first images comprises a first bounding shape that indicates a location of an object of a target category within the first image and a first shape-level label that labels the first bounding shape with the target category. The method includes training, by the one or more computing devices using the first training data, a machine-learned object detection model to provide bounding shapes for objects of the target category and shape-level labels that label bounding shapes with the target category. The method includes obtaining, by the one or more computing devices, second training data comprising one or more second images, wherein each of the second images comprises an image-level label that labels the second image with the target category. The method includes inputting, by the one or more computing devices, the one or more second images into the machine-learned object detection model. The method includes receiving, by the one or more computing devices as an output of the machine-learned object detection model for each of the second images, a second bounding shape that describes the location of a detected object of the target category within the second image and a second shape-level label that labels the second bounding shape with the target category. The method includes determining, by the one or more computing devices, mined training data comprising at least one of the second images and associated second bounding shape and second shape-level label determined by the machine-learned object detection model. The method includes training, by the one or more computing devices, the machine-learned object detection model using the mined training data.

The machine-learned object detection model may comprise a detection portion that includes one shape regression head and at least two different classification heads. Training the machine-learned object detection model may comprise training, by the one or more computing devices, a first classification head based on the first training data; training, by the one or more computing devices, the first shape regression head based on the first training data; and training, by the one or more computing devices, a second classification head based on the mined training data. Training the second classification head may comprise training, by the one or more computing devices, the second classification head on both the mined training data and the first training data. Training the second classification head may comprise determining, by the one or more computing devices, a loss associated with the second classification head. Determining the loss associated with the second classification head may comprise setting the loss to zero for training examples included in the mined training data and which belong to a background category. The machine-learned object detection model may comprise a region proposal portion that includes one shape regression head and at least two different classification heads. Training the machine-learned object detection model may comprise training, by the one or more computing devices, a first classification head based on the first training data; training, by the one or more computing devices, the first shape regression head based on the first training data; and training, by the one or more computing devices, a second classification head based on the mined training data. Training the second classification head may comprises training, by the one or more computing devices, the second classification head on both the mined training data and the first training data. The detection portion of the machine-learned object detection model may comprise a third classification head, and training the machine-learned object detection model comprises:

obtaining, by the one or more computing devices, data descriptive of a source machine-learned object detection model that is trained to determine one or more shape-level labels of a source category for one or more images; determining, by the one or more computing devices, a probability distribution on the source category output by the source machine-learned object detection model for one or more training images; and training, by the one or more computing devices, the third classification head and a feature extraction portion of the machine-learned object detection model based on a loss that describes a difference between a classification output of the third classification head provided for the one or more training images and the probability distribution on the source category output by the source machine-learned object detection model for the one or more training images. The machine-learned object detection model may comprise a region proposal portion that proposes regions that the detection portion of the machine-learned object detection model classifies and regresses. The source machine-learned object detection model may generate the probability distribution on the source category based on the regions proposed by the region proposal portion of the machine-learned object detection model. Receiving as the output of the machine-learned object detection model for each of the second images, the second shape-level label that labels the second bounding shape with the target category may comprise determining, by the one or more computing devices, a first classification output provided by the first classification head; determining, by the one or more computing devices, a second classification output provided by the second classification head; and generating, by the one or more computing devices, an overall classification output for the machine-learned object detection model based on a combination of the first classification output and the second classification output. The computer-implemented method of claim 1, wherein one or more parameters of the machine-learned object detection model are initialized based at least in part on a source machine-learned object detection model that is trained to determine one or more shape-level labels corresponding to a source category that is different from the target category.

Determining the mined training data may comprise identifying, by the one or more computing devices, an image from the one or more second images for which the associated shape-level label determined by the machine-learned object detection model matches the associated image-level label; and including, by the one or more computing devices, the identified image in the mined training data if the associated shape-level label determined by the machine-learned object detection model meets one or more confidence criteria.

The method may comprise obtaining, by the one or more computing devices, data descriptive of a plurality of first machine-learned object detection models that are trained based on the first training data with different settings to determine one or more shape-level labels corresponding to the target category for one or more images; determining, by the one or more computing devices, one or more shape-level labels corresponding to the target category for the one or more second images based on a consensus of the plurality of machine-learned object detection models.

The one or more second images may be image frames from a video. The one or more first images may be obtained from a user. The computer-implemented method may be performed as a service by a model customization platform.

A second example aspect of the present disclosure is directed to a non-transitory computer-readable media including data descriptive of a machine-learned object detection model. The machine-learned object detection model has a detection portion that includes a first classification head that is trained based on a first set of images with ground-truth shape-level labels, a first shape regression head that is trained based on the first set of images with ground-truth shape-level labels, and a second classification head that is trained based on a second set of images with mined shape-level labels. The second classification head of the detection portion may be trained based on both the first set of images with ground-truth shape-level labels and the second set of images with mined shape-level labels.

A third example aspect of the present disclosure is directed to a method for training a target machine-learned object detection model to determine shape-level labels corresponding to a target category, the target machine-learned object detection model including a feature extraction portion that generates a feature representation from an input image and a plurality of classification heads that generate respective classification outputs based on the feature representation. The method includes training a first classification head and the feature extraction portion of the target machine-learned object detection model based at least in part on first training data that comprises shape-level label data corresponding to the target category. The method includes training a second classification head of the target machine-learned object detection model and the feature extraction portion based at least in part on a loss that describes a difference between the classification output of the second classification head and a source classification output generated by a source machine-learned object detection model that is trained to determine one or more shape-level labels corresponding to a source category that is different from the target category. The second classification head of the region proposal portion may be trained based on first set of images with ground-truth shape-level labels and the second set of images with mined shape-level labels.

A fourth example aspect of the present disclosure is directed to a non-transitory computer readable media storing computer readable instructions for causing one or more computing devices to perform the method of the first example aspect and/or of the third example aspect. A fifth example aspect of the present disclosure is directed to a non-transitory computer readable media storing a machine-learned object detection model trained in accordance with the first example aspect and/or the third example aspect. A sixth example aspect of the present disclosure is directed to a computer system. The computer system includes one or more processors, and one or more non-transitory computer-readable media that, when executed by the one or more processors, cause the computer system to perform the method of the first aspect and/or of the third example aspect.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
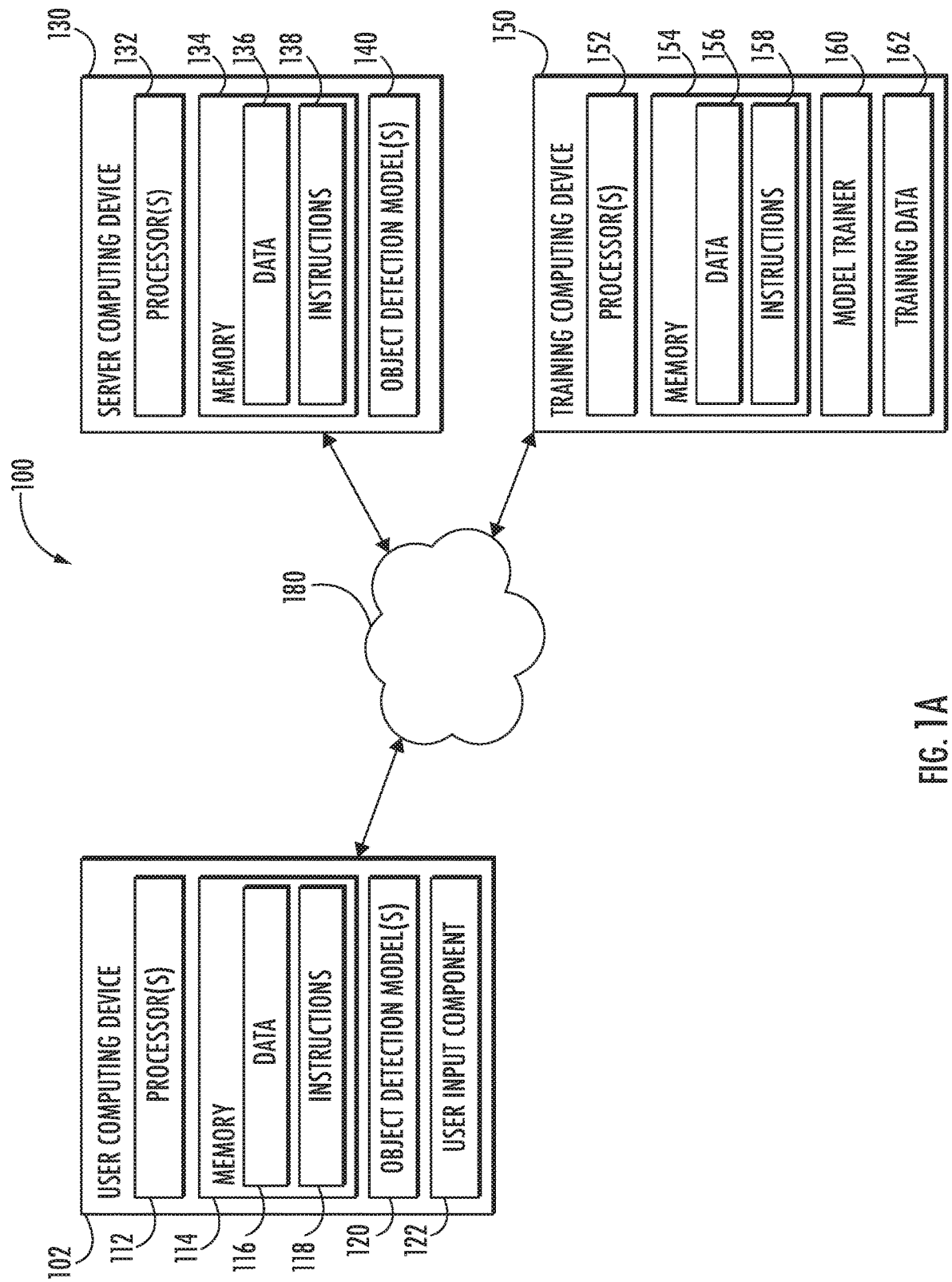
FIG. 1A depicts a block diagram of an example computing system that performs object detection according to example embodiments of the present disclosure.

Reference numerals that are repeated across plural figures are intended to identify the same features in various implementations.

DETAILED DESCRIPTION

Overview

Generally, the present disclosure is directed to systems and methods for performing semi-supervised object detection in which a few seed shape-level labels and a large set of image-level labels are used to train an object detection model. Thus, aspects of the present disclosure enable training a machine-learned object detection model to determine one or more bounding shapes that describe the location of one or more detected objects of a target category within an image and determine one or more shape-level labels that label the one or more bounding shapes with the target category. In particular, the systems and methods can be used to train the machine-learned object detection model based on training images that include a small amount of seed bounding shape labels and a large amount of image-level labels for the target category. In this way, the present disclosure can mitigate the cost of labeling a large number of bounding shapes for training an object detector, by reducing the dependence on expensive bounding shape labels during the training.

More particularly, the present disclosure provides for a semi-supervised object detection formulation that enables learning an object detector with a limited amount of labelled bounding shapes (e.g. 10 to 20 images with fully labeled bounding shapes) as well as a large amount of image-level labels. A bounding shape can include a two-dimensional polygonal shape (e.g., a bounding box), a three-dimensional polygonal shape; and/or an arbitrary shape (e.g., a set of pixels that have been assigned as depicting an object which may be referred to as an object segmentation). Images can include traditional visible spectrum images (e.g., photographs), aerial images, street-level images, Light Detection and Ranging (LIDAR) images, Radio Detection and Ranging (RADAR) images, infrared images, hyperspectral images, and/or various other forms of imagery.

Specifically, the object detector can be trained for a set of target categories for which a small amount of seed bounding shape labels (e.g., shape-level labels) and a large amount of image-level labels are available for training. In some implementations, the object detection model can also be trained based on a pre-trained object detector for source categories. Typically, the source and target categories do not overlap with each other.

In contrast to unsupervised training-mining techniques, systems and methods of the present disclosure can use the seed bounding shapes to train an initial object detector, mine bounding shapes with the initial object detector, train a new detector (e.g., re-train the initial object detector or a portion thereof) with both seed and mined bounding shapes, and iterate between mining and training steps.

However, the mining process inherently introduces various types of noise. First, the mining process inevitably misses some objects, which are treated as negative (e.g., background) samples in training phase; such false negatives are harmful for training the classification head of the object detector. Second, the boundaries of the mined bounding shapes are not precise, which is harmful for learning the shape regression head of the detector. Third, the class labels of the mined shapes cannot be 100% accurate, leading to some false positives. Because of these issues, the detection accuracy usually decreases as the training and mining steps are iterated if a standard object detector architecture (e.g., Faster RCNN) is employed.

According to aspects of the present disclosure, a semi-supervised object detection learning formulation is used to train a machine-learned object detection model. Example embodiments of a model trained according to the techniques described herein can be referred to as Noise Tolerant Ensemble RCNN (Note-RCNN). The semi-supervised object detection formulation described herein adopts the training-mining framework that can introduce various kinds of labelling noises (e.g., false negatives, false positives, inaccurate boundaries, etc.) that can be harmful to train standard object detectors (e.g., Faster RCNN). However, example machine-learned object detection models proposed by the present disclosure can include an ensemble of two classification heads and a shape regression head to avoid overfitting on noisy labels, and improve the mining precision, masking the negative sample loss in a detection portion of the model to avoid the harm of false negative labels, and training the shape regression head only on seed bounding shape labels to eliminate the harm from inaccurate boundaries of mined bounding shapes. The detection accuracy of the proposed models consistently improves as training the models iterates between mining and training steps, and state-of-the-art performance is achieved.

In some implementations, the object detection models of the present disclosure can include an ensemble of classification heads for both a region proposal portion (first stage) and a shape detection portion (second stage) of the model to increase the precision of the mined bounding shapes and reduce false positives. Specifically, one classification head can be only trained with seed bounding shape labels, and the other classification head is trained with both seed and mined bounding shape labels. The consensus of both heads can be employed to determine the confidence of the classification.

In some implementations, knowledge of a pre-trained detector on source categories can be utilized as weak teachers. Specifically, another classification head can be added to distill knowledge from a weak teacher; the distillation process acts as a regularizer to prevent the network from overfitting on the noisy labels.

According to another aspect, for the classification head in the shape detection portion that uses mined bounding shapes for training, the loss of predicting negatives (background) can be removed from its training loss, thus the training is not affected by the false negatives. In some implementations, the regression head is only trained with seed bounding shapes, which avoids it being affected by the inaccurate boundaries of the mined bounding shapes.

The systems and methods described herein provide a number of technical effects and benefits. In particular, the present disclosure identifies a practical semi-supervised object detection problem, with a limited amount of labelled bounding shapes as well as a large amount of image-level labels, identifies detrimental types of noise that inherently exists in training-mining framework, and provides a Note-RCNN architecture that is robust to such noise, and achieves state-of-the-art performance on benchmark datasets. For example, based on an evaluation of the aspects of the present disclosure on MSCOCO and ILSVRC datasets, the present disclosure can increase the precision of mined shape labels and can bring up to 40% improvement on detection performance by iterative training. Compared with weakly supervised detection, training with seed labels using Note-RCNN improves the state-of-the-art performance from 36.9% to 43.7%, while using standard Faster RCNN only achieves 38.7%. Additionally, based on a large-scale experiment which employs MSCOCO as seed labels and Open Image Dataset as image-level labels, the present disclosure can lead to consistent performance improvement during the training-mining process.

Example Problem Formulation

According to aspects of the present disclosure, a semi-supervised object detection learning formulation and training-mining framework is provided for training a machine-learned object detection model for target categories using a small amount of seed bounding shape labels (e.g., shape-level labels) $B^0$, as well as a large amount of image-level labels A. In some implementations, a pre-trained object detection model $S$ on source categories, which do not overlap with the target categories, is also used for training the model.

In some implementations, the machine-learned object detection model can be trained in an iterative training-mining framework, where the goal is to learn a detector $\mathcal{T}^t$ for target categories using $B^0$, A, and $S$, where t is the round of training.

Example Detector-Retraining Shape-Mining Pipeline

In some implementations, the training-mining framework can include the operations of detector initialization, shape mining, and detector retraining.

Detector initialization can include initializing an initial target detector $\mathcal{T}^0$ that is initialized from the source detector $S$ (that is, the parameters of the initial target detector $\mathcal{T}^0$ may initially be the same as those of the source detector $S$) and trained using the seed bounding shape labels $B^0$.

Shape mining can include using the current detector $\mathcal{T}^{t-1}$ to mine a set of high quality bounding shape labels $B^t$ for target categories from labels with image-level labels A. In some example implementations, a bounding shape is mined (e.g., selected for inclusion in a mined training dataset $B^t$) if it fulfills the following conditions: 1) its (predicted) label matches with the image-level ground truth label; 2) the shape's confidence score is the highest among all shapes with the same label; and 3) its confidence score is higher than a threshold $\theta_b$. The process can be summarized as $B^t=M(A, \mathcal{T}^{t-1}, \theta_b)$, where M is the shape mining function. Other criteria different than the numbered criteria described immediately above can alternatively or additionally be used as part of the shape mining function.

Detector retraining can include training a new detector $\mathcal{T}^t$ with the union of mined bounding shapes $B^t$ and the seed bounding shapes $B^0$. The parameters of the new detector $\mathcal{T}^t$ are initialized from the detector $\mathcal{T}^{t-1}$ from the previous iteration. The process can be summarized as $\mathcal{T}^t=R(B^t, B^0, \mathcal{T}^{t-1})$ where R represents the re-training function.

Example Model Structures

Certain example implementations of the models of the present disclosure can be referred to as Noise Tolerant Ensemble RCNN (Note-RCNN). The Note-RCNN model is similar in some respects to the Faster RCNN model. In Faster RCNN, object locations are predicted in two stages: region proposal stage (first stage) and shape detection stage (second stage). The first stage, called Region Proposal Network (RPN), outputs a set of class-agnostic proposal shapes for an image. It uses a feature extractor (e.g., VGG-16, ResNet-101) to extract intermediate feature maps from an image, and it predicts proposal shapes using ROI (region of interest) pooled features in a set of predefined anchors in this feature map. The classification head is denoted as rpn-cls, and the shape regression head as rpn-reg. For Faster RCNN, the loss function of RPN is as follows:

$$L(\{p_i\}, \{t_i\}) = \frac{1}{N_{cls}} \sum_i L_{cls}(p_i, p_i^*) + \frac{1}{N_{reg}} \sum_i p_i^* L_{reg}(t_i, t_i^*) \quad (1)$$

where i is the index of an anchor and $p_i$ is the predicted object probability of anchor i. The groundtruth label $p_i^*$ is 1 if the anchor's overlap with a groundtruth bounding shape is larger than a threshold and is 0 otherwise. $t_i$ is a vector encoding of the coordinates the bounding shape, and $t_i^*$ is that of the groundtruth shape associated with a positive anchor, $L_{cls}=-p_i^*\log(p_i)$ is binary cross-entropy loss, $L_{reg}$ is smooth L1 loss. In the second stage, called shape predictor network, features are cropped from the same intermediate feature maps for each proposal shape, and they are resized to a fixed size. These features are fed to the shape predictor network to predict class probabilities and class-specific shape refinement for each proposal. The classification head is denoted as det-cls, the boundary regression head as det-reg. The loss function for the second stage is similar to Equation 1. The only difference is that $p_i$ is replaced by $p_i^u$, which is the predicted probability of category u; correspondingly, $p_i^{u*}$ is 1 if the proposal shape's overlap with a shape with category u is larger than a threshold.

According to aspects of the present disclosure, in some implementations, the Note-RCNN model can include an ensemble of two classification heads and a distillation head to avoid overfitting on noisy labels and improve the mining precision, masking the negative sample loss in the shape predictor to get rid of the harm of false negative labels, and training the shape regression head only on seed labels to eliminate the effect of inaccurate shape coordinates of mined bounding shapes. In particular, in some implementations, the Note-RCNN model can include an ensemble of two classification heads in the shape detection stage (second stage of the detector).

In some implementations, the seed classification head det-cls is trained only on seed bounding shape labels $B^0$ so that it is not disturbed by the false negatives and false positives in the mined labels $B^t$. In some implementations, the mixed classification head det-cls-a utilizes both seed shape labels $B^0$ and mined shape labels $B^t$ for training. The consensus of the seed and mixed classification head can be employed for a robust estimation of classification confidence. In some implementations, the regression head det-reg is trained only on seed bounding shape labels $B^0$, too, so that it is not affected by the inaccurate shape coordinates in $B^t$.

Given that false negatives are extremely hard to eliminate in mined bounding shapes, in some implementations, the losses of "background" proposals in det-cls-a are not used in the loss to remove the effect of false negatives. Specifically, if an image i is from mined shape label set $B^t$, then we mask the losses from the proposals that belong to "background" category (typical implementation uses index 0 for background); if the image is from seed shape label set $B^0$, then the loss is calculated normally. Thus, in one example, the classification loss can be expressed as $$L_{det-cls-a}(p_i, u, i) = -p_i^{u*}\log(p_i^u) * \lambda(u, i), \qquad (2)$$

$$\lambda(u, i) = \begin{pmatrix} 0 & u = 0 \ \& \ i \notin B^0 \\ 1 & \text{otherwise} \end{pmatrix}$$

During training, the loss function for the shape predictor can consist of the losses of three heads: det-cls, det-reg and det-cls-a, i.e., $L_{det} = L_{det-cls} + L_{det-cls-a} + L_{det-reg}$. During inference, the classification probability outputs from det-cls and det-cls-a can be averaged.

According to aspects of the present disclosure, in some implementations, an additional binary classification head rpn-cls-a can be added in the region proposal stage (e.g., in the RPN). In some implementations, the seed classification head rpn-cls and the regression head rpn-reg are trained only on seed bounding shape labels $B^0$. The mixed head rpn-cls-a uses both seed shape labels $B^0$ and mined shape labels $B^t$ for training. In contrast with the shape detection stage, in some implementations, the background loss is not zeroed if the training image is from the mined label set, as RPN solves a binary classification problem and filtering background loss makes it unlearnable. During training, the loss function for RPN can come from the three heads, rpn-cls, rpn-reg and rpn-cls-a, which can be expressed as $L_{rpn} = L_{rpn-cls} + L_{rpn-cls-a} + L_{rpn-reg}$. During inference, the classification probability outputs from rpn-cls and rpn-cls-a can be averaged.

According to an aspect of the present disclosure, in some implementations, to transfer knowledge from a source detector S, another classification head det-cls-s can be added to the box predictor that classifies the source categories. This can enable additional noise tolerance, in order to stop the target detector from overfitting to noisy labels. During training, for an image $I_k$, the image $I_k$ is forwarded to the target detectors $T^t$ to generate proposal shapes $\{P_k^t\}$. Then the image $I_k$ is forwarded together with the proposals $P_k^t$ to the source detector S to get the probability distribution on the source classes for every proposal. The distribution can be used as a supervision to train det-cls-s. This process is known as knowledge distillation. The loss function can be expressed as $$L_{dist} = \frac{1}{N_{dist}} \sum_s \sum_j -p_s^{j*}\log(p_s^j) \qquad (3)$$

where j is the class index, s is the proposal index, $p_s^{j*}$ is the probability of proposal s for class j from source detectors, and $p_s^j$ is that from target detectors. In some implementations, the gradients generated from det-cls-s don't affect the parameters of det-cls-a, det-cls and det-reg, but they affect the feature extractor parameters. As the source detectors are trained on large scale clean labels, probability distribution generated from source detectors can be used as additional supervision to regularize the feature extractor in target detectors. In this way, the feature extractor can be prevented from overfitting the noisy labels without directly affecting the classification head of target categories.

With reference now to the Figures, example embodiments of the present disclosure will be discussed in further detail.

Example Devices and Systems

FIG. 1A depicts a block diagram of an example computing system 100 that performs object detection according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more object detection models 120. For example, the object detection models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example object detection models 120 are discussed with reference to FIGS. 2-5.

In some implementations, the one or more object detection models 120 can be received from the server computing system 130 over network 180, stored in the user computing device memory 114, and then used or otherwise implemented by the one or more processors 112. In some implementations, the user computing device 102 can implement multiple parallel instances of a single object detection model 120 (e.g., to perform parallel object detection across multiple instances of images).

More particularly, the object detection models 120 can be trained to receive a set of input data descriptive of one or more images and, as a result of receipt of the one or more images, provide output data that includes shape-level labels that indicate a location of an object of a target category within one of the images. The object detection models 120 can include an ensemble of two classification heads and a shape regression head to avoid overfitting on noisy labels, improve mining precision, avoid the harm of false negative labels, and eliminate the harm from inaccurate boundaries of mined bounding shapes. Example embodiments of the object detection models 120 can be referred to as Noise Tolerant Ensemble RCNN (Note-RCNN) models. In some implementations, the object detection models 120 can include an ensemble of classification heads for both a region proposal portion (first stage) and a shape detection portion (second stage) of the model to increase the precision of the mined bounding shapes and reduce false positives. The consensus of both heads can be employed to determine the confidence of the classification.

Additionally or alternatively, one or more object detection models 140 can be included in or otherwise stored and implemented by the server computing system 130 that communicates with the user computing device 102 according to a client-server relationship. For example, the object detection models 140 can be implemented by the server computing system 140 as a portion of a web service (e.g., a customization service for object detection models). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned object detection training models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2-5.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the object detection models 120 and/or 140 based on a set of training data 162. The training data 162 can include, for example, one or more first images with one or more seed bounding shape labels corresponding to a target category. Each seed bounding shape label can indicate a location of an object of the target category within one of the first images. The training data 162 can also include, for example, one or more second images with one or more image-level labels corresponding to the target category. Each shape-level label can indicate the presence of an object of the target category within one of the first images. In some implementations, the training data 162 can include, for example, a pre-trained object detection model that is trained on a source category which does not overlap with the target category. According to aspects of the present disclosure, the model trainer 160 can train the machine-learned models 120 and/or 140 in an iterative training-mining framework. At each iteration, the model trainer 160 can obtain mined data that can include one or more bounding shape labels that indicate a location of an object of the target category within one or more of the second images. The model trainer 160 can include the mined data obtained at each iteration as part of training data 162 for a next iteration. Example training models 160 are discussed with reference to FIGS. 2-5.

In some implementations, the model trainer 160 can use a semi-supervised object detection learning formulation, which adopts a training-mining framework, to train one or more machine-learned object detection models 120 and/or 140. In some implementations, the model trainer can mask the negative sample loss in an object detection portion of the models 120 and/or 140 to avoid the harm of false negative labels. In some implementations, the model trainer 160 can train a shape regression portion of the models 120 and/or 140 only on seed bounding shape labels (e.g., bounding shape labels associated with the first images in the training data 162). In some implementations, the model trainer 160 can train one classification head of the models 120 and/or 140 with only seed bounding shape labels, and train the other classification head with both seed and mined bounding shape labels. In some implementations, the training model 160 can train a third classification head to distill knowledge from a pre-trained detector on source categories. The training model 160 can use the knowledge distillation process as a regularizer to prevent overfitting the models 120 and/or 140 on noisy labels. In some implementations, the model trainer 160 can remove the loss of predicting negatives (background) from the training loss of the classification head in the shape detection portion that uses mined bounding shapes to avoid being affected by the false negatives. In some implementations, the training model 160 can train the regression head with only seed bounding shape labels to avoid being affected by inaccurate boundaries of the mined bounding shapes.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
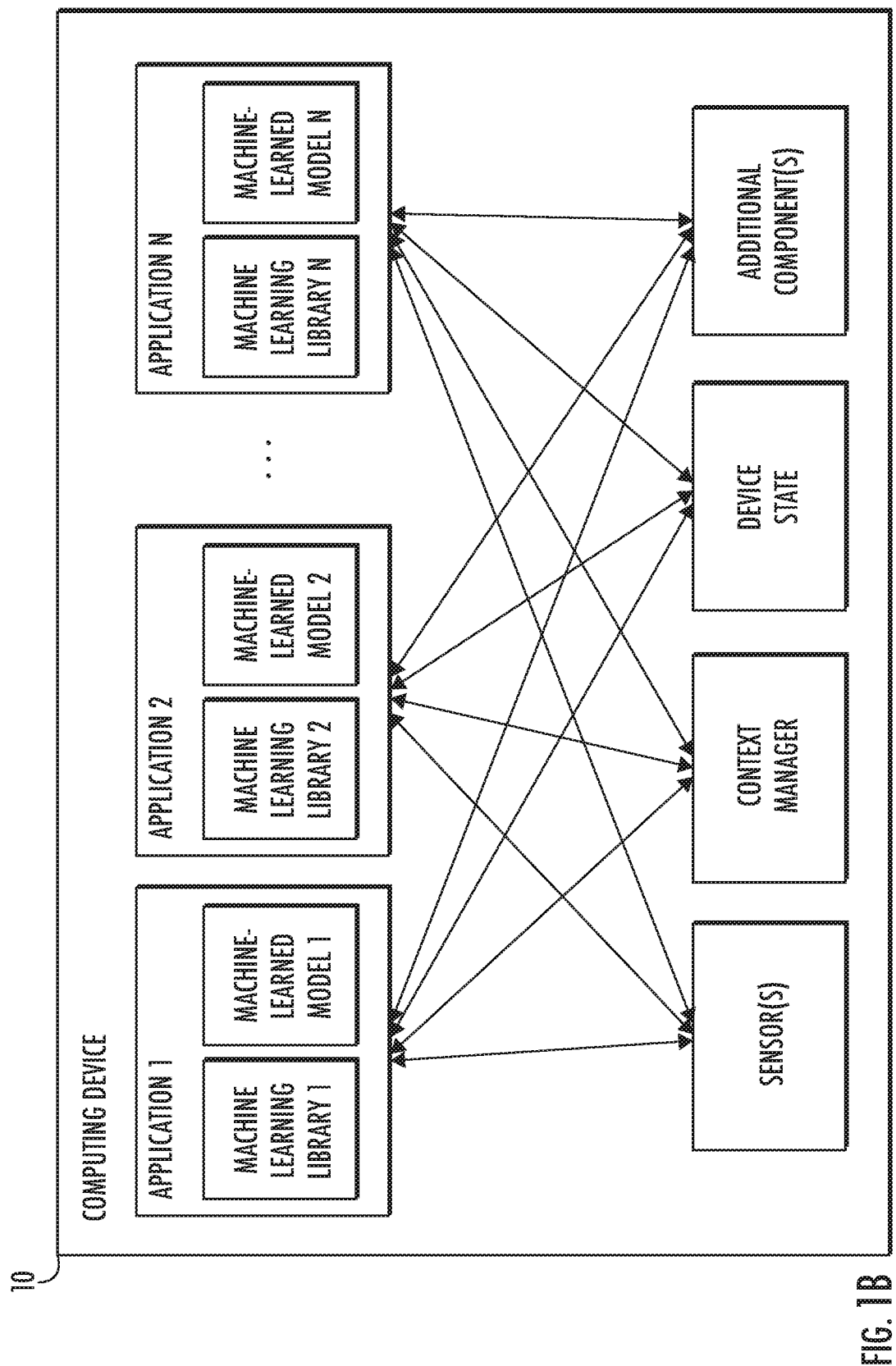
FIG. 1B depicts a block diagram of an example computing device that performs object detection according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
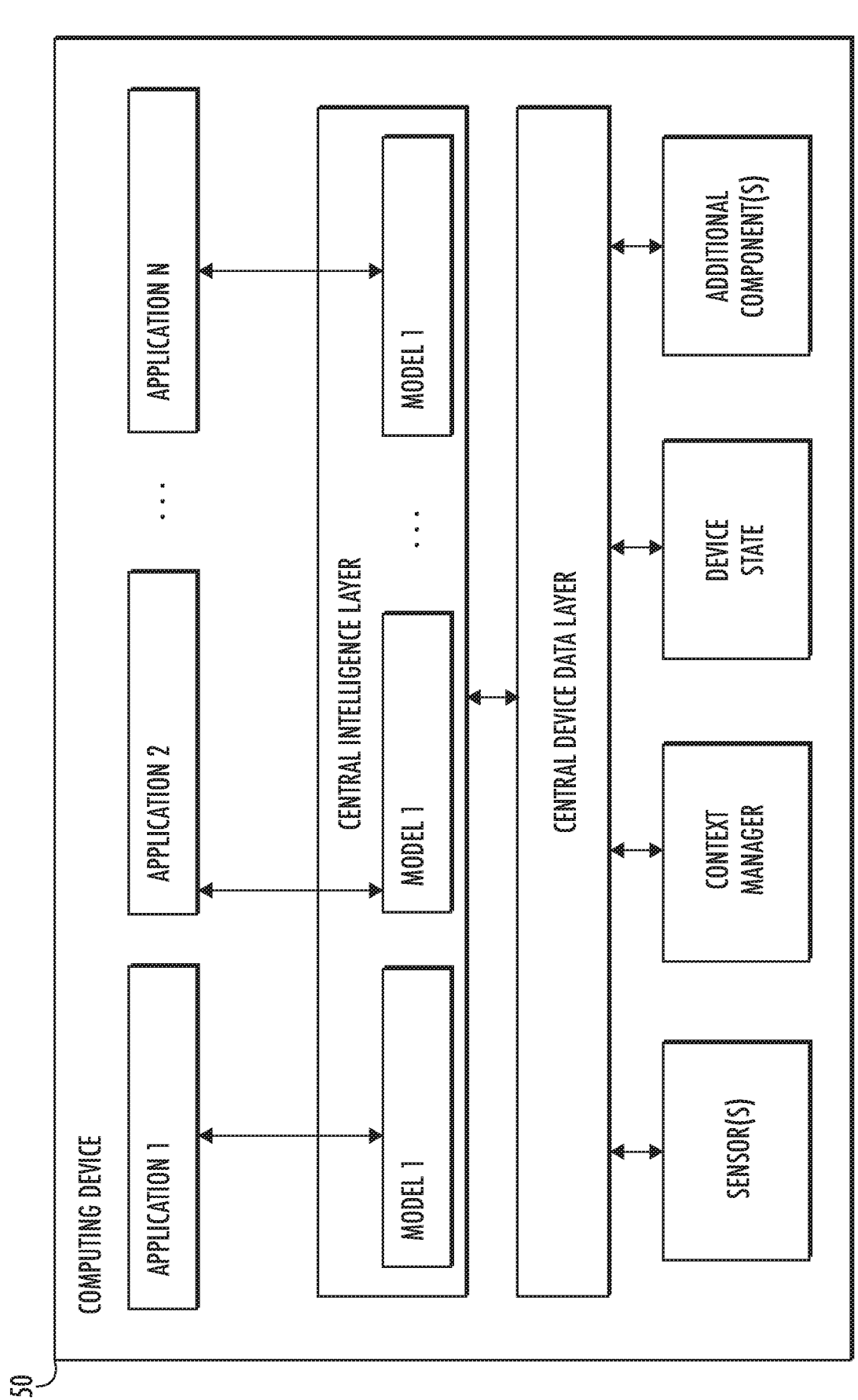
FIG. 1C depicts a block diagram of an example computing device that performs object detection according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2:
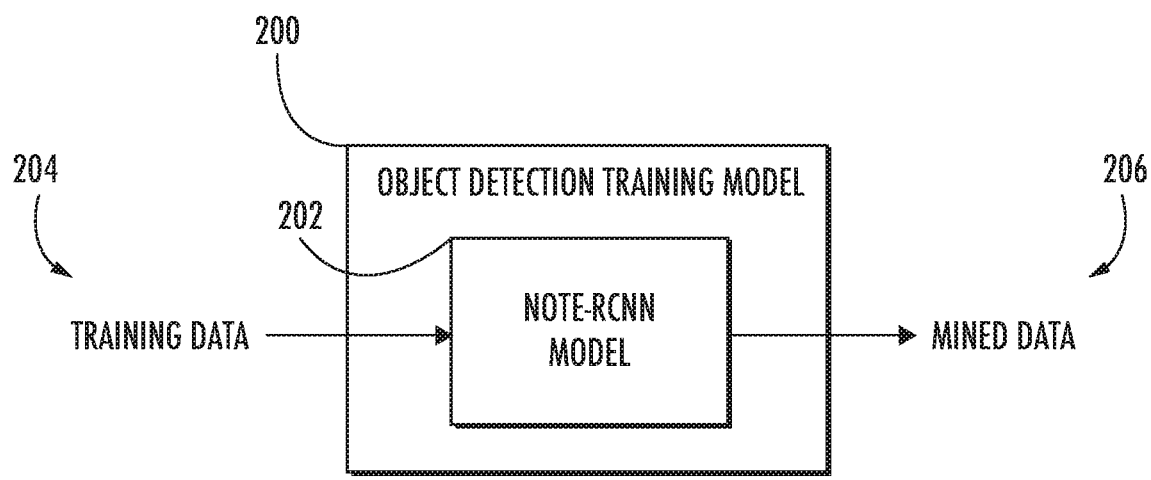
FIG. 2 depicts a block diagram of an example object detection training model and an example object detection model according to example embodiments of the present disclosure.

FIG. 2 depicts a block diagram of an example object detection training model 200 and an example object detection model 202 (Note-RCNN) according to example embodiments of the present disclosure. In some implementations, the object detection training model 200 is configured to train the object detection model 202. The object detection model 202 can be trained to receive a set of input images and, as a result of receipt of the input images, provide output data that includes one or more shape-level labels that indicate a location of an object of a target category within one or more of the input images. During the training, the object detection training model 200 can obtain training data 204 and train the object detection model 202 based on the training data 204 over one or more iterations. At each iteration, the object detection training model 200 can obtain mined data 206 as an output of the object detection model 202. The object detection training model 200 can include at least a portion of the mined data 206 as part of training data 204 for training the object detection model 202 at a next iteration.

Figure 3:
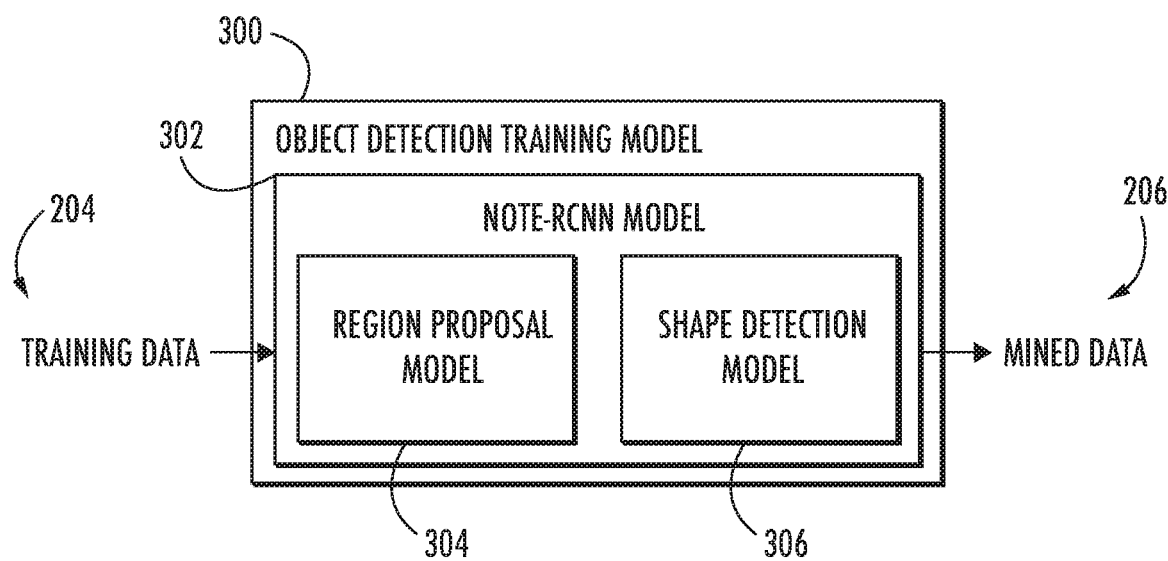
FIG. 3 depicts a block diagram of an example object detection training model and an example object detection model according to example embodiments of the present disclosure.

FIG. 3 depicts a block diagram of an example object detection training model 300 and an example object detection model 302 (Note-RCNN) according to example embodiments of the present disclosure. The object detection model 302 is similar to object detection model 202 of FIG. 2 except that object detection model 302 further includes a region proposal model 304 and a shape regression model 306. In some implementations, the object detection training model 300 is configured to train the object detection model 302. The object detection model 302 can be trained to receive a set of input images and, as a result of receipt of the input images, provide output data that includes one or more shape-level labels that indicate a location of an object of a target category within one or more of the input images. During the training, the object detection training model 300 can obtain training data 204 and train the region proposal model 304 and the shape detection model 306 based on the training data 204 over one or more iterations. At each iteration, the object detection training model 300 can obtain mined data 206 as an output of the object detection model 302. The object detection training model 300 can include at least a portion of the mined data 206 as part of training data 204 for training the object detection model 302 at a next iteration.

Figure 4:
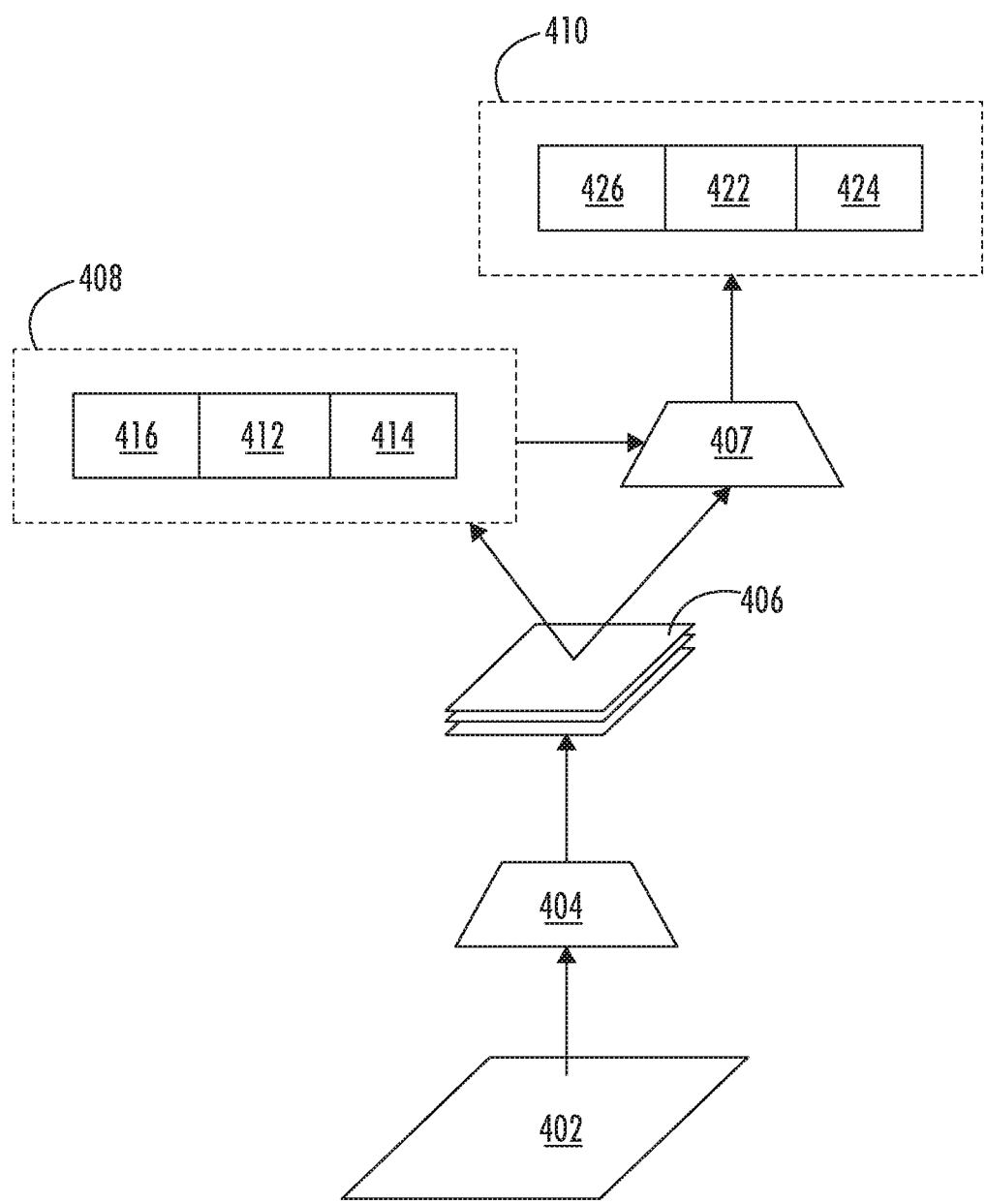
FIG. 4 depicts a block diagram of an example machine-learned object detection model according to example embodiments of the present disclosure.

FIG. 4 depicts a block diagram of the object detection training model 300 training the object detection model 302 according to example embodiments of the present disclosure. At a first stage, the object detection training model 302 can obtain training data 204 that includes one or more training images 402, and determine a set of region proposals for each training image 402. In particular, the object detection training model 302 can process training image 402 by a feature extractor 404 to determine a plurality of feature maps including an intermediate feature map 406. The object detection training model 302 can input the intermediate feature map 406 into a region proposal model 408 to determine the set of region proposals. The object detection training model 300 can initialize the region proposal model 408 based on a pre-trained object detection model in training data 402 that is trained on a source category. The region proposal model 408 can be configured to receive the intermediate feature map 406 and, as a result of receipt of the intermediate feature map 406, provide output data that includes one or more class-agnostic shape proposals. The region proposal model 408 can include a first classification head, a second classification head, and a shape regression head; and the output data of the region proposal model 408 can include classification data 412 determined by the first classification head, regression data 414 determined by the shape regression head, and classification data 416 determined by the second classification head. The object detection training model 300 can train the first classification head and the shape regression head of the region proposal model 408 using only seed bounding shape labels in training data 402; and train the second classification head of the region proposal model 408 using the seed bounding shape labels and previously mined bounding shape labels in training data 402. During training, the object detection training model 300 can determine a loss of the first stage based on a loss associated with the first classification head, second classification head, and shape regression head of the region proposal model 408. For example, the object detection training model 300 can determine the loss of the first stage as a sum of the losses associated with the first classification head, second classification head, and shape regression head of the region proposal model 408. During inference, the object detection model 302 can determine an average of a classification probability output by the first classification head and second classification head of the region proposal model 408, and provide the determined average as part of the output at the first stage.

At a second stage, the object detection training model 302 can determine a cropped feature map 407 by cropping the intermediate feature map 406 based on the set of region proposals determined at the first stage, and input the cropped feature map 407 into a shape detection model 410 to determine a class probability and class-specific shape refinement for each region proposal in the set of region proposals. The object detection training model 300 can initialize the shape detection model 410 based on a pre-trained object detection model in training data 402 that is trained on a source category. The shape detection model 410 can be configured to receive the cropped feature map 407 and, as a result of receipt of the cropped feature map 407, provide output data that includes the class probability and class-specific shape refinement for each region proposal. The shape detection model 410 can include a first classification head, a second classification head, and a shape regression head; and the output of the shape detection model 410 can include classification data 422 determined by the first classification head, regression data 424 determined by the shape regression head, and classification data 426 determined by the second classification head. The object detection training model 300 can train the first classification head and the shape regression head of the shape detection model 410 using only seed bounding shape labels in training data 402; and train the second classification head of the shape detection model 410 using the seed bounding shape labels and previously mined bounding shape labels in training data 402. In this way, the first classification head of the shape detection model 410 is not disturbed by false negatives or false positives in the mined training data, and the shape regression head of the shape detection model 410 is not affected by inaccurate boundaries. During training, the object detection training model 300 can determine a loss of the second stage based on a loss associated with the first classification head, second classification head, and shape regression head of the shape detection model 410. For example, the object detection training model 300 can determine the loss of the second stage as a sum of the losses associated with the first classification head, second classification head, and shape regression head of the shape detection model 410. In some implementations, the object detection training model 300 can filter the losses from background proposals in the second classification head of the shape detection model 410, in order to avoid the false negatives disturbing the first classification head. Specifically, if the training image 402 is from mined training data, then the loss from proposals that belong to a background category is zeroed, and if the training image 402 is from the one or more first images in the training data 162, then the loss is calculated normally. For example, the object detection training model 300 can determine the loss of the second stage as a sum of the loss associated with the first classification head, the filtered loss associated with the second classification head, and the loss associated with the shape regression head of the shape detection model 410. During inference, the object detection model 302 can determine an average of a classification probability output by the first classification head and second classification head of the shape detection model 410, and provide the determined average as part of the output at the second stage.

Figure 5:
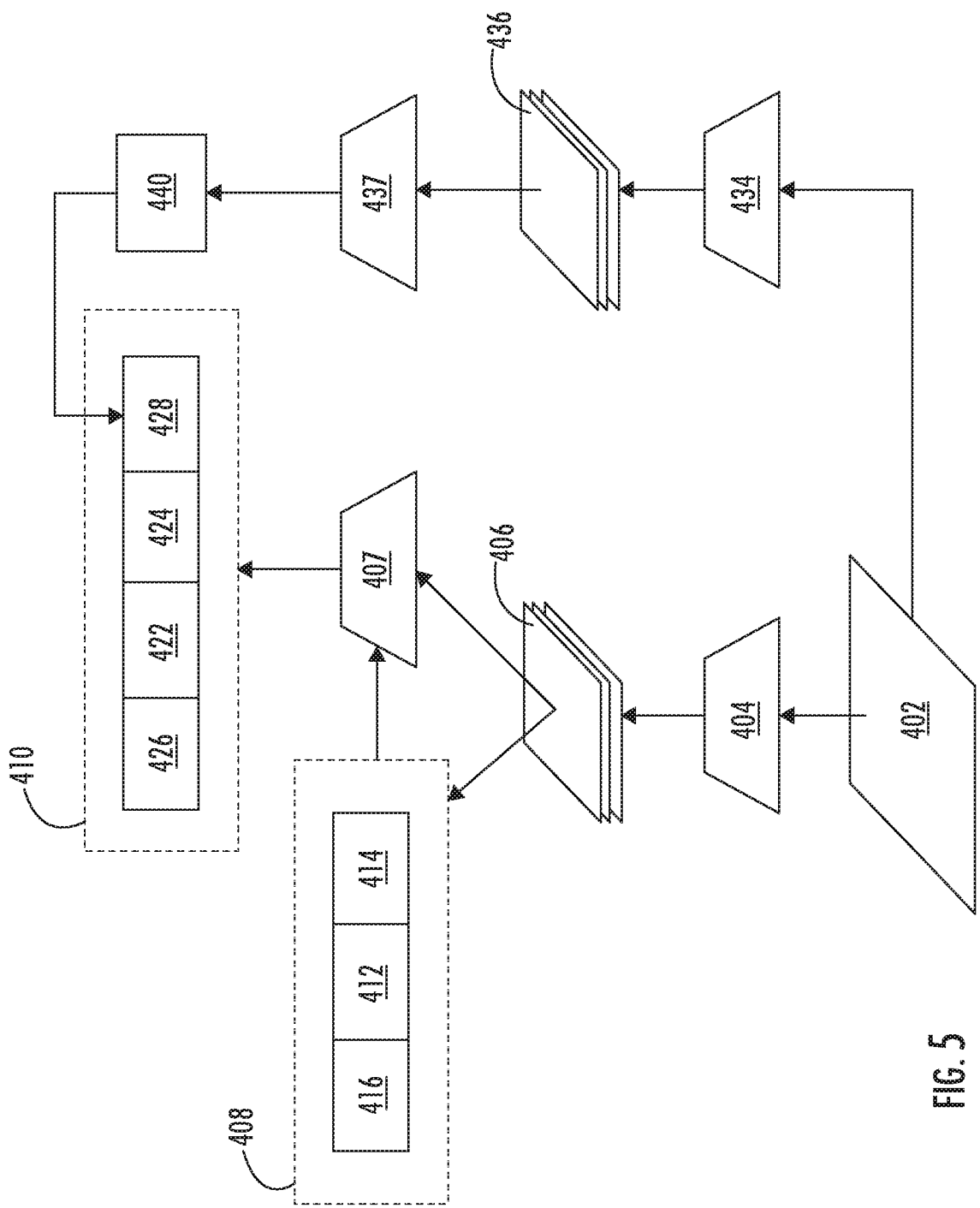
FIG. 5 depicts a block diagram of an example machine-learned object detection model according to example embodiments of the present disclosure.

FIG. 5 depicts a block diagram of the object detection training model 300 training the object detection model 302 according to example embodiments of the present disclosure. FIG. 5 is similar to FIG. 4 except that the shape detection model 410 includes a third classification head to transfer knowledge from a pre-trained object detection model 440 in training data 402 that is trained on a source category. The object detection training model 300 can initialize the third classification head of the shape detection model 410 based on the pre-trained object detection model 440, and the third classification head can be configured to classify the source category. During training, the object detection training model 300 can input the intermediate feature map 406 into the region proposal model 408 and obtain the set of region proposals for training image 402 at the first stage. At the second stage, the object detection training model 300 can determine and input cropped feature map 407 into the shape detection model 410 to determine the class probability and class-specific shape refinement for each region proposal in the set of region proposals. The output of the shape detection model 410 can include classification data 422 determined by the first classification head, regression data 424 determined by the shape regression head, classification data 426 determined by the second classification head, and classification data 428 determined by the third classification head. Additionally, the object detection training model 300 can forward training image 402 and the determined set of region proposals for training image 402 to the pre-trained object detection model 440 to determine a classification probability distribution on the source category for each region proposal in the set of region proposals. In particular, the object detection training model 302 can process training image 402 by a feature extractor 434 to determine a plurality of feature maps including an intermediate feature map 436. The object detection training model 302 can determine cropped feature map 437 by cropping the intermediate feature map 436 based on the set of region proposals, and input the cropped feature map 437 into the pre-trained object detection model 440. The pre-trained object detection model 440 can be configured to receive the cropped feature map 437 and, as a result of receipt of the cropped feature map 437, provide output data that includes a classification probability distribution on the source category for each region proposal in the set of region proposals. The object detection training model 300 can determine a loss associated with the pre-trained object detection model 440, and can train the third classification head of the shape detection model 410 based on the classification probability distribution output by the pre-trained object detection model 440. For example, the object detection training model 300 can use the classification probability distribution as supervision to train the third classification head of the shape detection model 410. The object detection training model 300 can determine gradients based on the third classification head, and adjust one or more parameters of feature extractor 404 based on the gradients. For example, the object detection training model 410 can use the classification probability distribution generated by from the pre-trained object detection model 440 as additional supervision to regularize the feature extractor 404 in order to prevent it from overfitting on noisy labels.

Example Methods

Figure 6:
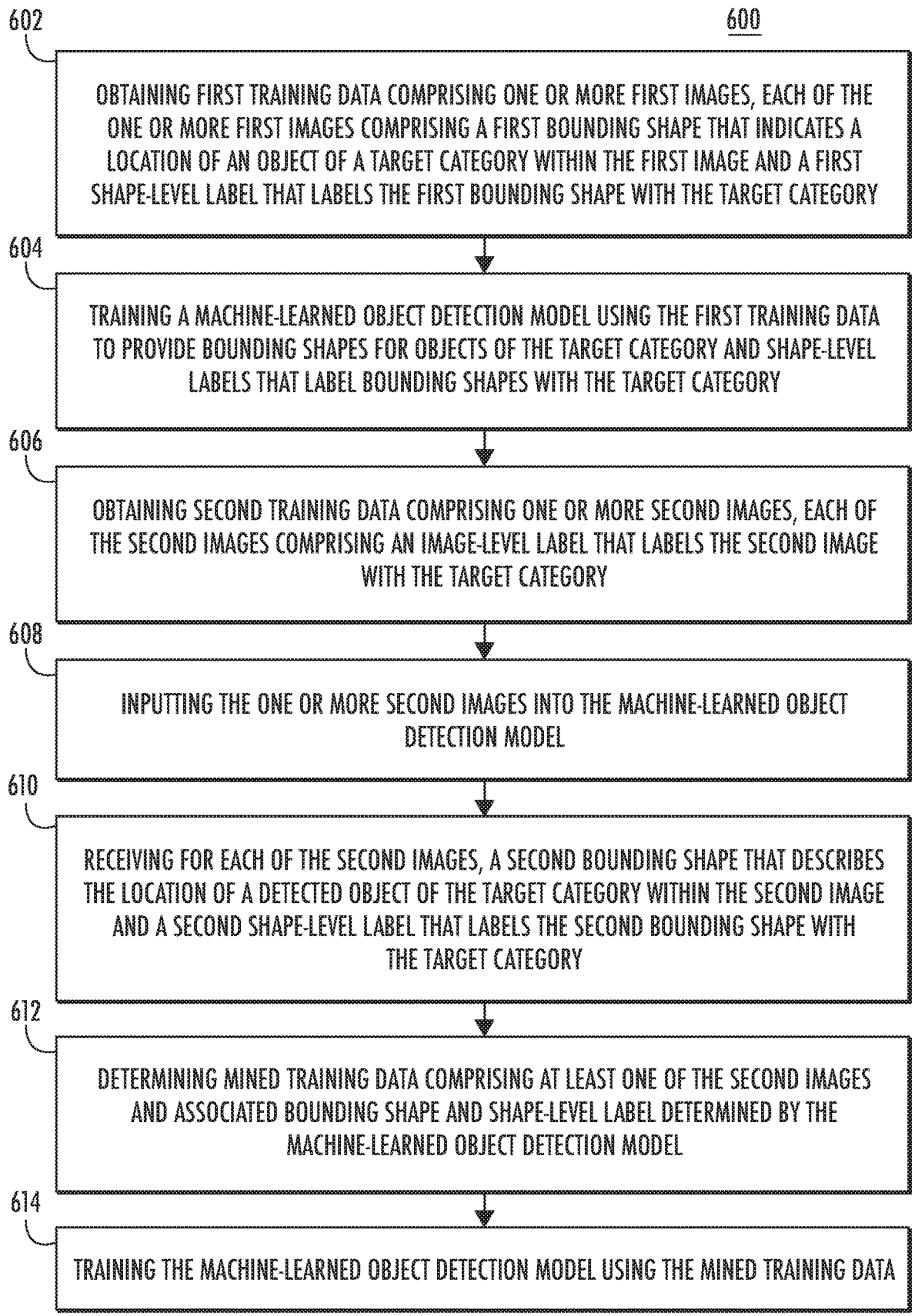
FIG. 6 depicts a flow chart diagram of an example method to perform object detection according to example embodiments of the present disclosure.

FIG. 6 depicts a flow chart diagram of an example method to perform according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system can obtain first training data comprising one or more first images, each of the one or more first images comprising a first bounding shape that indicates a location of an object of a target category within the first image and a first shape-level label that labels the first bounding shape with the target category. For example, the model trainer 300 via the training computing system 150 can obtain training data 204 including first training data comprising one or more first images. Each of the one or more first images comprises a first bounding shape and a first shape-level label. The first bounding shape can indicate a location of an object of a target category within the first image, and the first shape-level label can label the first bounding shape with the target category. In some implementations, the model trainer 300 can obtain the one or more first images from a user, for example, via the user input component 122.

At 604, the computing system can train a machine-learned object detection model using the first training data to provide bounding shapes for objects of the target category and shape-level labels that label bounding shapes with the target category. For example, the model trainer 300 can use the first training data from training data 204 to train the machine-learned object detection model 302 to provide bounding shapes for objects of the target category and shape-level labels that label the bounding shapes with the target category. The machine-learned object detection model 302 can comprise a region proposal portion (e.g., first part) and a shape detection portion (e.g., second part).

The shape detection portion can include the shape detection model 410 comprising a first regression head and a plurality of classification heads. The model trainer 300 can train the first regression head and a first classification head of the shape detection model 410 based on the first training data from training data 204. In some implementations, training data 204 can include mined training data based on an output of the machine-learned object detection model 302 at a previous iteration, and the model trainer 300 can train a second classification head of the shape detection model 410 based on the mined training data from training data 204. In some implementations, the model trainer 300 can train the second classification head based on both the mined training data and the first training data from training data 204. In some implementations, the model trainer 300 can determine a loss associated with the second classification head for training the second classification head. The model trainer 300 can determine the loss associated with the second classification head such that the loss is set to zero for training examples included in the mined training data which belong to a background category. In some implementations, the model trainer 300 can obtain training data 204 including data descriptive of the pre-trained object detection model 440 (e.g., a source machine-learned object detection model) that is trained to determine one or more shape-level labels of a source category for one or more images. The model trainer 300 can determine a probability distribution on the source category output by the pre-trained object detection model 440 for one or more training images 402 from training data 204. The model trainer 300 can train a third classification head of the shape detection model 408 and the feature extractor 404 of the machine-learned object detection model 302 based on a loss that describes a difference between a classification output of the third classification head provided for the one or more training images 402 and the probability distribution on the source category output by the pre-trained object detection model 440 for the one or more training images 402.

The region proposal portion can include a region proposal model 408 comprising a first regression head, and a plurality of classification heads. The model trainer 300 can train the first regression head and a first classification head of the region proposal model 408 based on the first training data from training data 204. In some implementations, training data 204 can include mined training data based on an output of the machine-learned object detection model 302 at a previous iteration, and the model trainer 300 can train a second classification head of the region proposal model 408 based on the mined training data from training data 204. In some implementations, the model trainer 300 can train the second classification head based on both the mined training data and the first training data from training data 204. In some implementations, the shape detection portion of the machine-learned object detection model 302 can classify and regresses the regions proposed by the region proposal portion of the machine-learned object detection model 302. In some implementations, the pre-trained object detection model 440 can generate the probability distribution on the source category based on the regions proposed by the region proposal portion of the machine-learned object detection model 302. In some implementations, one or more parameters of the machine-learned object detection model 302 (e.g., feature extractor 404, region proposal model 408, shape detection model 410, etc.) are initialized based at least in part on the pre-trained object detection model 440.

At 606, the computing system can obtain second training data comprising one or more second images, each of the second images comprising an image-level label that labels the second image with the target category. For example, the model trainer 300 can obtain training data 204 including second training data comprising one or more second images. Each of the one or more second images comprises an image-level label that labels the second image with the target category. In some implementations, the one or more second images are image frames from a video.

At 608, the computing system can input the one or more second images into the machine-learned object detection model. For example, the model trainer 300 can input the second training data from training data 204 into the machine-learned object detection model 302.

At 610, the computing system can receive for each of the second images, a second bounding shape that describes the location of a detected object of the target category within the second image and a second shape-level label that labels the second bounding shape with the target category. For example, the model trainer 300 can receive, as an output of the machine-learned object detection model 302 for each of the one or more second images from the second training data, a second bounding shape that describes the location of a detected object of the target category within the second image and a second shape-level label that labels the second bounding shape with the target category. In some implementations, the machine-learned object detection model 302 can determine a first classification output 422 provided by the first classification head of the shape detection model 410, determine a second classification output 426 provided by the second classification head of the shape detection model 410, and generate an overall classification output for the machine-learned object detection model 302 based on a combination of the first classification output 422 and the second classification output 426.

At 612, the computing system can determine mined training data comprising at least one of the second images and associated bounding shape and shape-level label determined by the machine-learned object detection model. For example, the model trainer 300 can determine mined training data comprising at least one of the second images from the second training data, and associated second bounding shape and second shape-level label determined by the machine-learned object detection model 302. In some implementations, the model trainer 300 can identify an image from the one or more second images from training data 204 for which the associated shape-level label determined by the machine-learned object detection model 302 matches the associated image-level label. The model trainer 300 can include the identified image in the mined training data if the associated shape-level label determined by the machine-learned object detection model 302 meets one or more confidence criteria.

At 614, computing system can train the machine-learned object detection model using the mined training data. For example, the model trainer 300 can train the machine-learned object detection model 302 using the mined training data at a next iteration. In some implementations, model trainer 300 can obtain data descriptive of a plurality of first machine-learned object detection models 302 that are trained based on the first training data with different settings to determine one or more shape-level labels corresponding to the target category for one or more images. The model trainer 300 can determine one or more shape-level labels corresponding to the target category for the one or more second images based on a consensus of the plurality of machine-learned object detection models 302. In some implementations, the model trainer 300 can train the machine-learned object detection model 302 as a service by a model customization platform.

Example Implementation Details

According to aspects of the present disclosure, an example implementation of the systems and methods described herein can use Inception-Resnet-V2 as the feature extractor (e.g., feature extractor 404) of the detector (e.g., machine-learned object detection model 302). The Inception-Resnet-V2 feature extractor is initialized from the weights trained on ImageNet classification dataset. All input images (e.g., training images 402) are resized to 600*1024. In the first stage, 300 region proposals are selected, and SGD is used with momentum with batch sizes of 1 and learning rate at 0.0003. The example implementation can be implemented using the Tensorflow Object Detection API. In all the experiments except the OID one, 8 iterations of training-mining process are employed, because performance generally saturates after 8 iterations. In each iteration, the detector is trained for 20 epochs. The mining threshold $\theta_b$ is set to 0.99 if no other specification is given.

Example Datasets

According to aspects of the present disclosure, one or more benchmark datasets can be used to evaluate the example implementation. The one or more benchmark datasets can include MSCOCO 2017. MSCOCO contains 80 categories, which is a superset of PASCAL VOC categories. Both training and validation data is split to VOC categories (source categories) and non-VOC categories (target categories). If an image has both source category and target category bounding shapes, this image is used in both source category data and target category data, but source category and target category data only contains bounding shapes with the corresponding categories.

The source category training data is used to train source detectors. For target category training data, a certain amount of images is randomly picked for each category as seed groundtruth bounding shape labels, and only image-level labels are kept for the rest of images. The target detectors are evaluated on the target category validation data. To evaluate the method under varied amounts of seed labels, the experiment includes seed labels with different average sizes: [12, 33, 55, 76, 96]. The average size means the average number of labeled images per category.

The one or more benchmark datasets can also include ILSVRC 2013. The ILSVRC 2013 validation set is split into two subsets val1 and val2, and val1 is augmented with images from the ILSVRC 2013 training set such that each class has 1000 labeled bounding shapes in total. Among the 200 object categories in ILSVRC 2013, the first 100 are used in alphabetical order as sources categories and rest are used as target categories. All images of the source categories in augmented val1 set are used as the source training set, and that of the target categories in val2 set are used as the source validation set. For target training set, 10-20 images are randomly selected for each target category in augment val1 set as seed groundtruth bounding shapes, and the rest of images are used as image-level labels by removing the bounding shape information. All images of the target categories in val2 set are used as target validation set.

The one or more benchmark datasets can also include OpenImage v4. The training set of OpenImage V4 contains 14.6M bounding shapes for 600 object classes on 1.74M images. Only the image-level labels are kept for those images by removing all bounding shape information. The whole MSCOCO dataset is used as the seed bounding shape label set $B^0$, and the aforementioned OpenImage images are used as image-level labels A to evaluate whether the method can improve performance when there is a large number of groundtruth bounding shapes.

Example Experiment Settings

According to aspects of the present disclosure, the mean Average Precision (mAP), which is averaged mAP over IOU thresholds in [0.5:0.05:0.95], is used to measure object detection performance. The mAP@IOU 0.5 is also reported. To measure the quality of mined shape labels, shape recall and shape precision are reported. Shape recall means the percentage of the true positive shapes in the mined labels over all groundtruth shapes, Shape precision means the percentage of the true positive shapes over all shapes in the mined labels.

According to aspects of the present disclosure, in order to evaluate the contribution of each component in NOTE-RCNN, the following system variants can be designed for ablation studies:

(1) Naive: no additional classification head is added to the region proposal portion nor the shape detection portion of the standard Faster RCNN; and both mined labels and seed groundtruth labels are used to train the classification heads and regression heads (for both region proposal and shape detection).

(2) Det-A: the additional classification head det-cls-a is added to the shape detection portion, but not to the region proposal portion; the original head det-cls and det-reg are trained by the seed groundtruth labels, det-cls-a is trained on both seed groundtruth data and seed labels; and the background sample loss is not zeroed.

(3) Det-AZ: Similar to Det-A, but the background sample loss is zeroed in this variant.

(4) Det-AZ&RPN-A: the additional classification heads are added to both the region proposal portion and the shape detection portion. det-cls, det-reg, rpn-cls, rpn-reg are trained on the seed groundtruth labels, det-cls-a and rpn-cls-a are trained on both seed labels and mined labels; and the background sample loss on det-cls-a is zeroed, but not on rpn-cls-a.

(5) Det-AZ&RPN-A&Distill: Similar to Det-AZ&RPN-A, but the distillation head is also added.

Example Experiments

Figure 7:
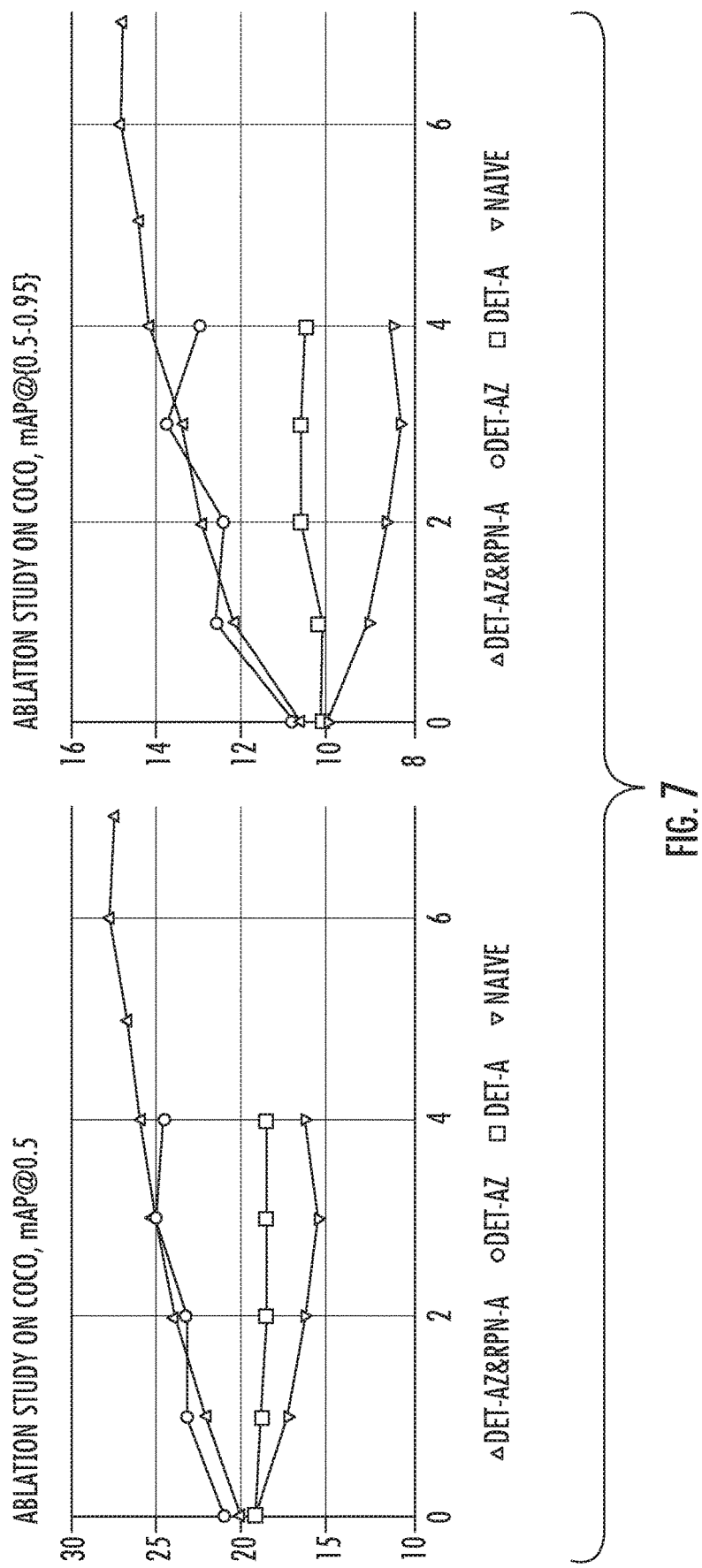
FIG. 7 depicts example ablation studies on MSCOCO 2017 dataset according to example embodiments of the present disclosure.
Figure 8:
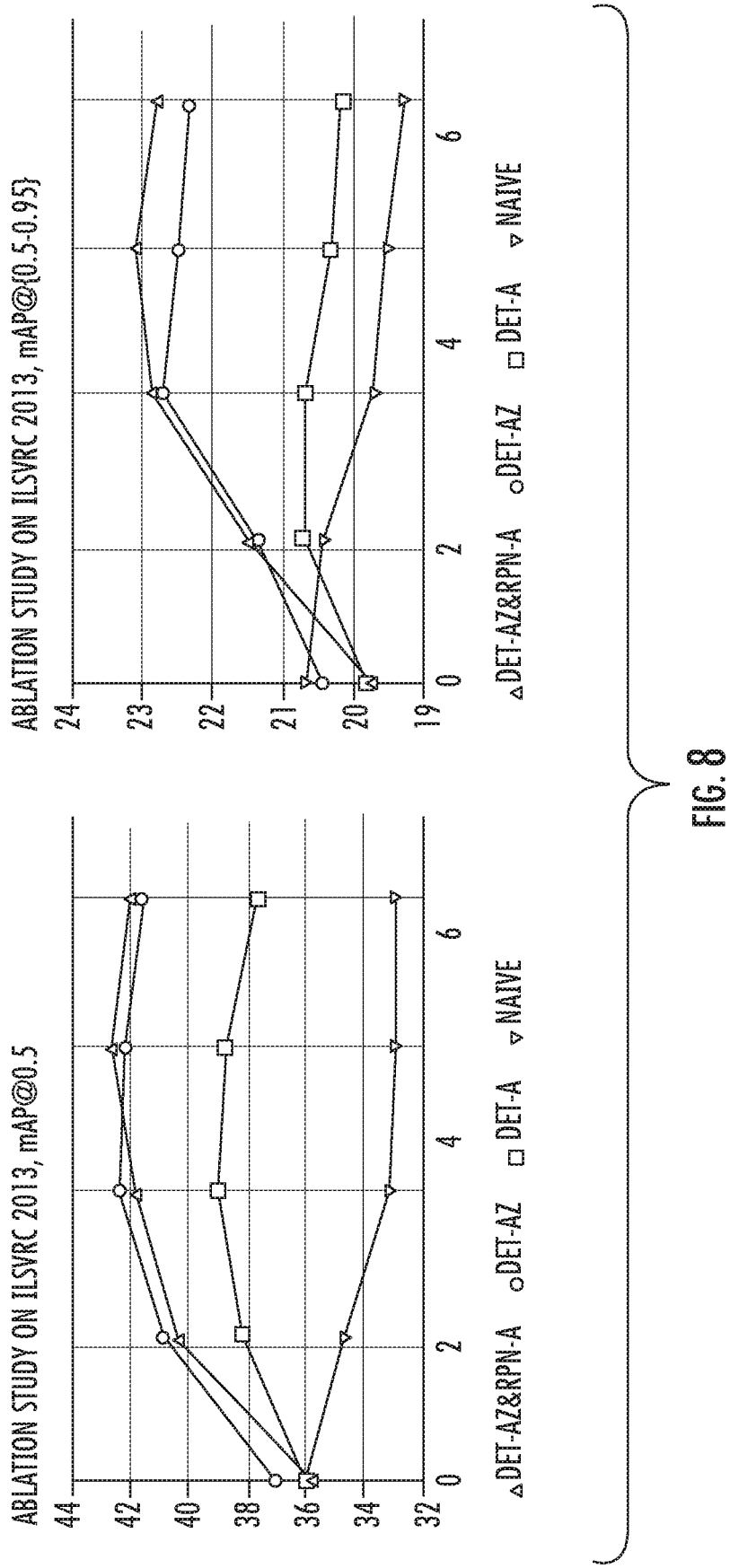
FIG. 8 depicts ablation studies on ILSVRC 2013 dataset according to example embodiments of the present disclosure.

According to aspects of the present disclosure, in order to show the contribution of each component, ablation studies are performed on the additional heads and the system variants. Experimental results on MSCOCO are shown in FIG. 7. For Naive, Det-A and Det-AZ, training is stopped in 4 iterations, as the performance already decreases in iteration 4. For Det-AZ&RPN-A, training is stopped in 8 iterations. Experimental results on ILSVRC 2013 are shown in FIG. 8. On this dataset, all system variants are trained for 4 iterations. Iteration 0 means that the detector is only trained on the seed groundtruth shape labels. The performances on iteration 0 for different system variants is slightly different, because each detector is initialized independently.

As can be seen from Naive models, if the seed groundtruth labels are not separated with mined labels, and the regression head and classification head are trained with all data, the performance drops immediately after the mined data is added (iteration 1 and after). For Det-AZ and Det-A, it can be observed that zeroing the background loss gives significant improvements on both MSCOCO (in FIG. 7) and ILSVRC (in FIG. 8). Comparing Det-AZ&RPN-A and Det-AZ in MSCOCO (FIG. 7), it can be seen that the performance of Det-AZ&RPN-A consistently increases, but that of Det-AZ starts to decrease after the 3rd iteration. The reason is that more accurate region proposal and shape detection helps to improve the performance of each other. Specifically, the ensemble classification heads in the region proposal portion improve the proposal quality, resulting in the discovery of more object proposals; higher quality object proposals are beneficial to the shape detection performance; better shape detection performance leads to higher quality mined labels, which in turn improves the region proposal portion accuracy. Thus, applying ensemble classification heads to both the region proposal portion and the shape detection portion are important for consistent performance increase. The difference between Det-AZ&RPN-A and Det-AZ on ILSVRC (in FIG. 8) is not significant. The reason is that ILSVRC 2013 is a relatively simple dataset for detection, where an image usually only contains 1 to 2 objects of interest and the area of object is usually large, leading to lower mining label difficulty.

Figure 10:
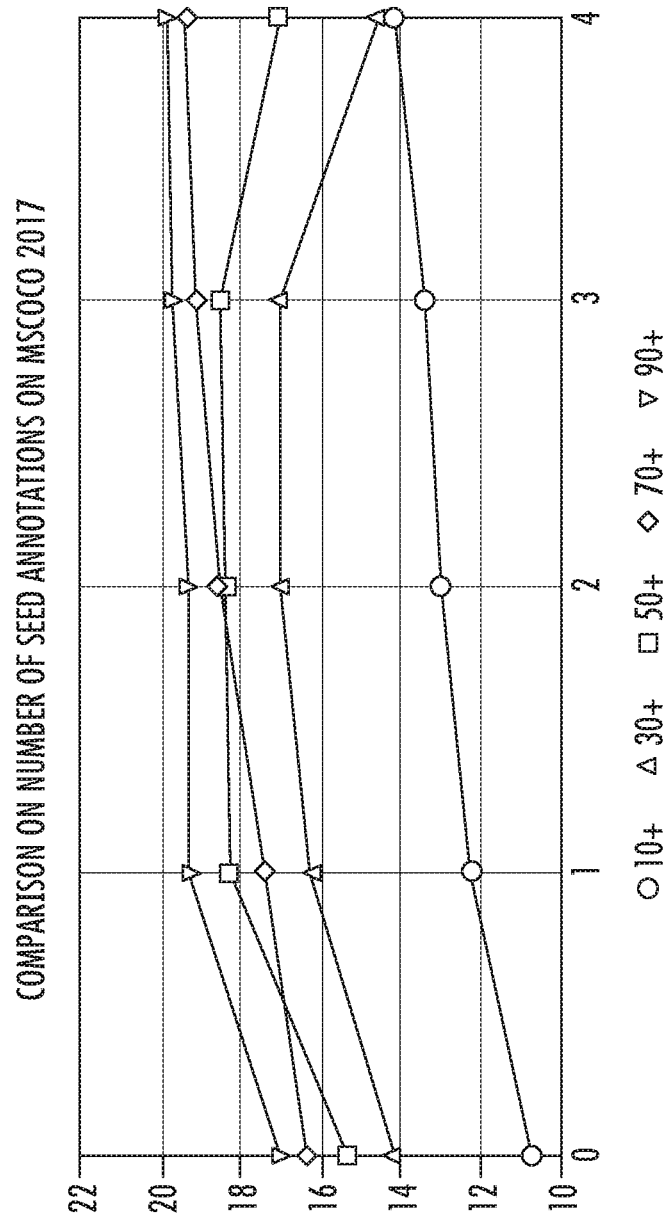
FIG. 10 depicts a comparison on different amount of seed labels on MSCOCO 2017 dataset according to example embodiments of the present disclosure.

According to aspects of the present disclosure, in order to evaluate the performance of the proposed method using different amount of seed bounding shape labels, example implementations of NOTE-RCNN are tested with varied sizes of seed labels set on MSCOCO. The average sizes (average number of labeled images per category) tested are [12, 33, 55, 76, 96]. The method used for evaluation is Det-AZ&RPN-A. As can be seen in FIG. 10, NOTE-RCNN provides steady performance improvements for all experiments, indicating the effectiveness of the proposed method when different amount of seed labeled images are used.

TABLE 1

Comparison between "with distillation" and "without distillation" on label mining on MSCOCO 2017, threshold $\theta_b$ is set to be 0.99.

| | Det-AZ&RPN-A | | Det-AZ&RPN-A&Distill | |
|---|---|---|---|---|
| # iter | # shapes | prec(%) | # shapes | prec(%) |
| 1 | 21542 | 90.0 | 22972 | 88.3 |
| 2 | 38323 | 87.1 | 32698 | 90.8 |
| 3 | 44223 | 86.6 | 38727 | 89.9 |
| 4 | 54680 | 84.9 | 41576 | 90.0 |
| 5 | 60899 | 83.7 | 42756 | 89.9 |

Figure 9:
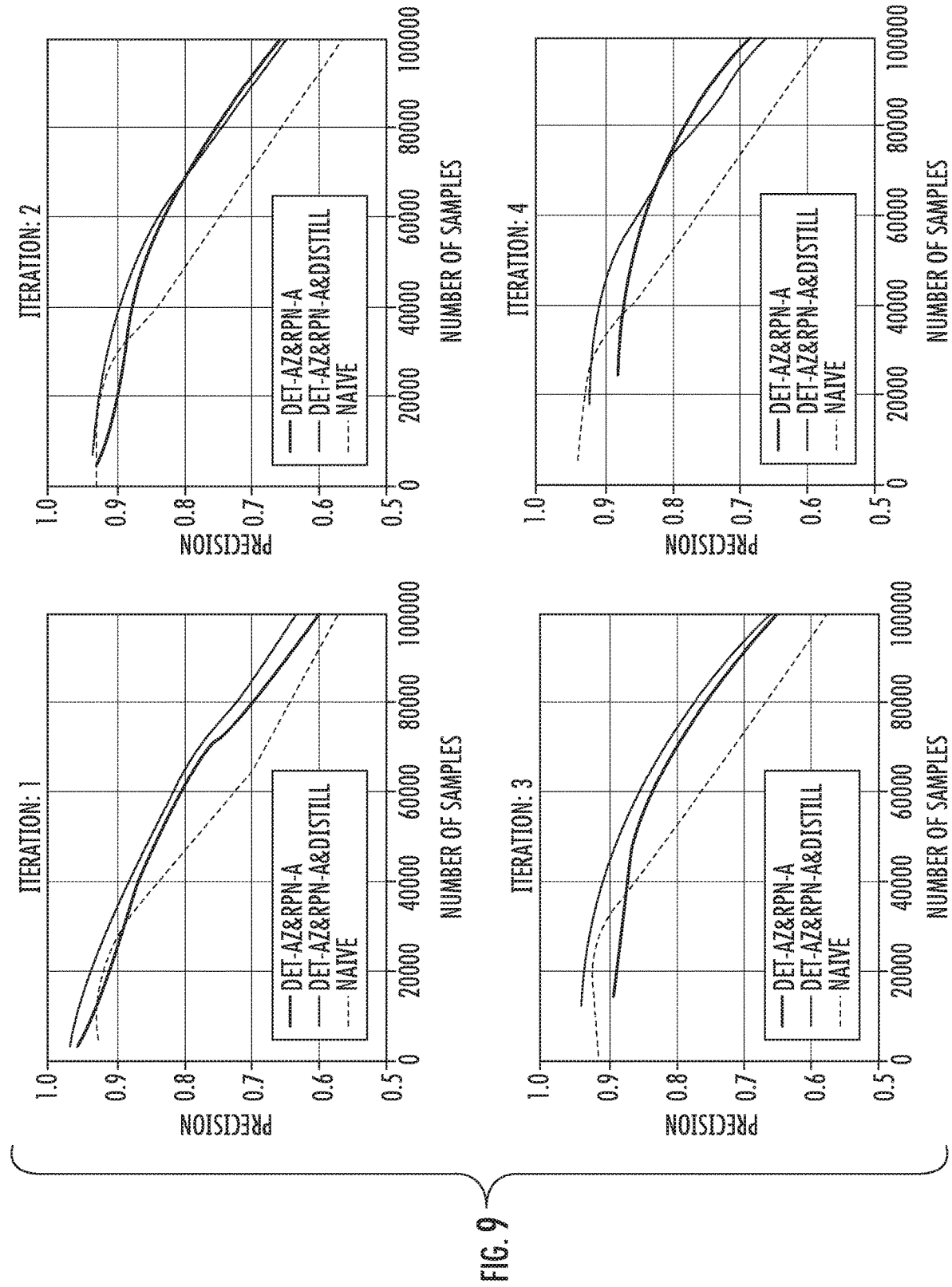
FIG. 9 depicts a comparison on "Box Precision vs Number of Samples Curve" of mined labels on MSCOCO 2017 dataset according to example embodiments of the present disclosure.

According to aspects of the present disclosure, the bounding shape mining precision for Naive, Det-AZ&RPN-A and Det-AZ&RPN-A&Distill methods is evaluated. First, "shape precision vs number of samples" curves of mined labels on MSCOCO are determined, shown in FIG. 9. This curve is generated by varying the mining threshold $\theta_b$ from 0 to 1.0, and the part of curve that falls in between $[0,10^5]$ samples is shown. The results of 1st to 4th iterations are shown. The precision of Naive drops very fast when the number of samples increase; Det-AZ&RPN-A performs better than Naive when the number of samples is large; Det-AZ&RPN-A&Distill achieves the best precision performance.

Additionally, the actual precision is compared with the number of shapes in each iteration between Det-AZ&RPN-A and Det-AZ&RPN-A&Distill by setting the $\theta_b$ as 0.99. As shown in Table 1: (1) without using distillation, the precision decreases gradually, from 90.0% to 83.7%, with distillation, the precision is preserved at around 90.0%; (2) the increasing speed of mined shape number of Det-AZ&RPN-A is higher than that of Det-AZ&RPN-A&Distill. Generally, it can be seen that Det-AZ&RPN-A performs better than Naive, which shows the effectiveness of the ensemble classification heads, and using distillation head further improves the mining precision by preventing the network from overfitting noisy labels.

Figure 11:
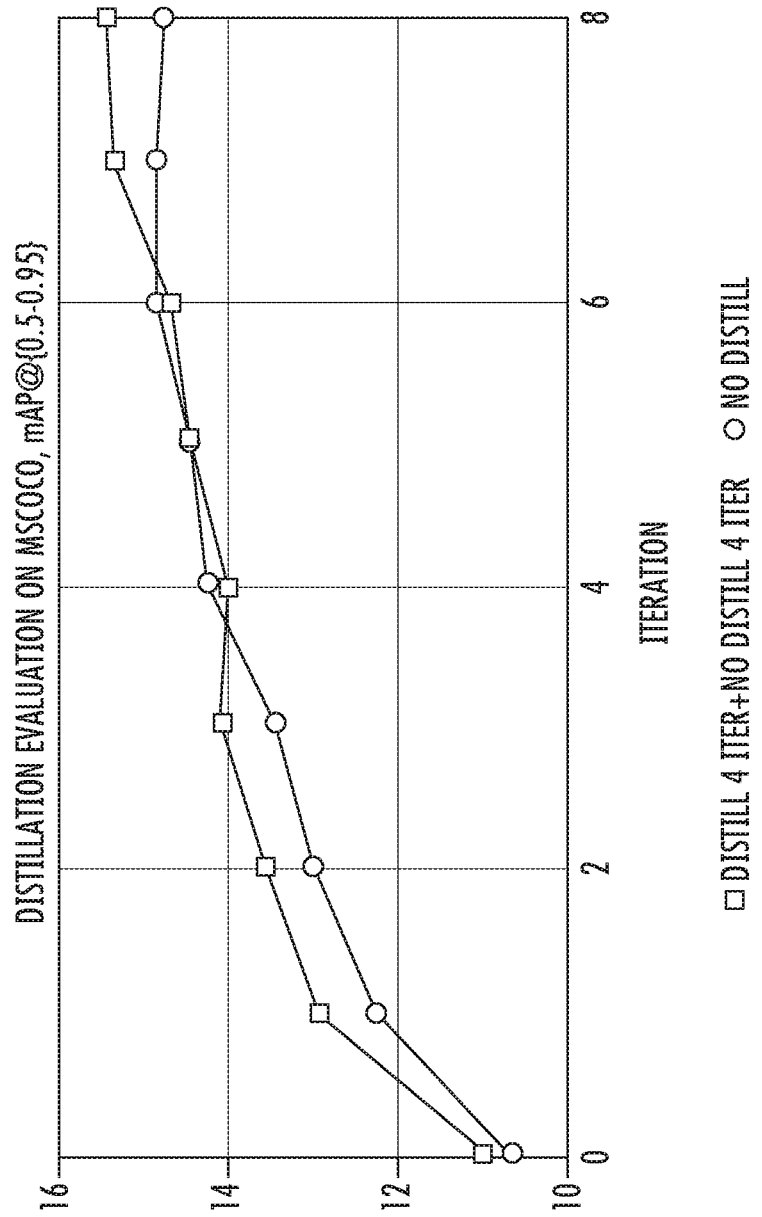
FIG. 11 depicts a comparison between "half-distill" and "no-distill" on target detector performance on MSCOCO 2017 dataset according to example embodiments of the present disclosure.

The quantity (number of shapes) and quality (shape precision) of labels are the two key factors that influence the shape detector performances: both higher quality and higher quantity result in better detectors. In some implementations, the distillation (higher quality) is combined with the non-distillation (larger quantity) method, called half-distill. Det-AZ&RPN-A&Distill is applied in the first 4 iterations and Det-AZ&RPN-A is applied in the later 4 iterations. The experimental results are shown in FIG. 11: 1) in the beginning stage (first three iterations), the performance of "half-distill" is significantly better than that of "no-distill", because "half-distill" can generate higher quality labels; 2) in the middle stage (around 4 iterations), "no-distill" catches "half-distill", as "half-distill" suffers from fewer mined labels; 3) in the final stage, after the "half-distill" is switched to "no-distill", the performance improves again.

According to aspects of the present disclosure, two stronger baseline methods are built based on state-of-the-art SemiMIL because it doesn't use seed shape labels for the target categories. The baselines include: 1) SemiMIL+Seed+FRCN: SemiMIL is used to mine the shape labels from images, and then the same seed labels are used for the training set, to train a standard Faster RCNN; and 2) SemiMIL+Seed+NOTE-RCNN: similar to the previous baseline, but the standard Faster RCNN is replaced by NOTE-RCNN.

TABLE 2

Comparison with state-of-the-art on ILSVRC 2013

| model | backbone | mAP |
|---|---|---|
| LSDA | alexnet | 18.1 |
| Tang | alexnet | 20.0 |
| FRCN + SemiMIL | alexnet | 23.3 |
| FRCN + SemiMIL | inception-resnet | 36.9 |
| FRCN + SemiMIL + Seed | inception-resnet | 38.7 |
| NOTE-RCNN + SemiMIL + Seed | inception-resnet | 39.9 |
| Det-AZ&RPN-A (without distill) | inception-resnet | 42.6 |
| Det-AZ&RPN-A&Distill (with distill) | inception-resnet | 43.7 |

The performance of state-of-the-art methods and the new baselines are shown in Table 2. Comparing FRCN+SemiMIL+Seed and FRCN+SemiMIL, it can see that by adding seed labels, the performance increases by 1.8%. By changing Faster RCNN to NOTE-RCNN, the performance increases by 1.2%, which shows the effectiveness of NOTE-RCNN in handling the noisy labels. Systems and methods consistent with the present disclosure (e.g., without distill) can achieve 42.6% mAP and outperforms all state-of-the-art methods; by applying distillation (e.g., with distill), the performance can be improved to 43.7%.

Previous evaluation shows that the systems and methods consistent with the present disclosure can consistently improve performance when the number of seed bounding shape labels varies from 10 to 90. Additionally, the effectiveness of the proposed method is evaluated when a relatively large number of seed bounding is available. Specifically, the whole MSCOCO dataset is used (all 80 categories, around 15 k shapes per category) as the seed label set $B^0$, and Openimage V4 as image-level label set A, (only image-level labels are used). Det-AZ&RPN-A is tested in this experiment, and the results are shown in Table 3. It can be seen that the systems and methods consistent with the present disclosure can still consistently improve the shape detection performance during the training-mining process. However, the performance improvements saturates at iteration 2. The reason is the initial detector trained with already have good accuracy, and it takes less iteration to mine enough useful bounding shapes. It shows that even when a large amount of shape-level labels is available, larger scale of image-level label augmentation is still helpful for further performance improvement.

TABLE 3

"mscoco" means the Det-AZ&RPN-A is only trained on MSCOCO, "iter k" means iterative training of Det-AZ&RPN-A on OpenImage image label set for k times.

|  | mscoco | iter 1 | iter 2 | iter 3 |
| --- | --- | --- | --- | --- |
| mAP@{0.5-0.95} | 32.2 | 33.6 | 34.0 | 34.0 |

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for training a machine-learned object detection model, the method comprising:

obtaining, by one or more computing devices, first training data comprising one or more first images, wherein each of the one or more first images comprises a first bounding shape that indicates a location of an object of a target category within the first image and a first shape-level label that labels the first bounding shape with the target category;

training, by the one or more computing devices using the first training data, a machine-learned object detection model to provide bounding shapes for objects of the target category and shape-level labels that label the bounding shapes with the target category;

obtaining, by the one or more computing devices, second training data comprising one or more second images, wherein each of the one or more second images comprises an image-level label that labels the second image with the target category;

inputting, by the one or more computing devices, the one or more second images into the machine-learned object detection model;

receiving, by the one or more computing devices as an output of the machine-learned object detection model for each of the second images, a second bounding shape that describes the location of a detected object of the target category within the second image and a second shape-level label that labels the second bounding shape with the target category;

determining, by the one or more computing devices, mined training data comprising at least one of the second images and associated second bounding shape and second shape-level label determined by the machine-learned object detection model; and training, by the one or more computing devices, the machine-learned object detection model using the mined training data.

2. The computer-implemented method of claim 1, wherein the machine-learned object detection model comprises a detection portion that includes one shape regression head and at least two different classification heads, and training the machine-learned object detection model comprises:

training, by the one or more computing devices, a first classification head based on the first training data;

training, by the one or more computing devices, the first shape regression head based on the first training data; and training, by the one or more computing devices, a second classification head based on the mined training data.

3. The computer-implemented method of claim 2, wherein training the second classification head comprises training, by the one or more computing devices, the second classification head on both the mined training data and the first training data.

4. The computer-implemented method of claim 3, wherein training the second classification head comprises:

determining, by the one or more computing devices, a loss associated with the second classification head, wherein determining the loss associated with the second classification head comprises setting the loss to zero for training examples included in the mined training data and which belong to a background category.

5. The computer-implemented method of claim 2, wherein the machine-learned object detection model comprises a region proposal portion that includes one shape regression head and at least two different classification heads, and training the machine-learned object detection model comprises:

training, by the one or more computing devices, a first classification head based on the first training data;

training, by the one or more computing devices, the first shape regression head based on the first training data; and training, by the one or more computing devices, a second classification head based on the mined training data.

6. The computer-implemented method of claim 5, wherein training the second classification head comprises training, by the one or more computing devices, the second classification head on both the mined training data and the first training data.

7. The computer-implemented method of claim 2, wherein the detection portion of the machine-learned object detection model comprises a third classification head, and training the machine-learned object detection model comprises:

obtaining, by the one or more computing devices, data descriptive of a source machine-learned object detection model that is trained to determine one or more shape-level labels of a source category for one or more images;

determining, by the one or more computing devices, a probability distribution on the source category output by the source machine-learned object detection model for one or more training images; and training, by the one or more computing devices, the third classification head and a feature extraction portion of the machine-learned object detection model based on a loss that describes a difference between a classification output of the third classification head provided for the one or more training images and the probability distribution on the source category output by the source machine-learned object detection model for the one or more training images.

8. The computer-implemented method of claim 7, wherein the machine-learned object detection model comprises a region proposal portion that proposes regions that the detection portion of the machine-learned object detection model classifies and regresses, and wherein the source machine-learned object detection model generates the probability distribution on the source category based on the regions proposed by the region proposal portion of the machine-learned object detection model.

9. The computer-implemented method of claim 2, wherein receiving as the output of the machine-learned object detection model for each of the second images, the second shape-level label that labels the second bounding shape with the target category comprises:

determining, by the one or more computing devices, a first classification output provided by the first classification head;

determining, by the one or more computing devices, a second classification output provided by the second classification head; and generating, by the one or more computing devices, an overall classification output for the machine-learned object detection model based on a combination of the first classification output and the second classification output.

10. The computer-implemented method of claim 1, wherein one or more parameters of the machine-learned object detection model are initialized based at least in part on a source machine-learned object detection model that is trained to determine one or more shape-level labels corresponding to a source category that is different from the target category.

11. The computer-implemented method of claim 1, wherein determining the mined training data comprises:

identifying, by the one or more computing devices, an image from the one or more second images for which the associated shape-level label determined by the machine-learned object detection model matches the associated image-level label; and including, by the one or more computing devices, the identified image in the mined training data if the associated shape-level label determined by the machine-learned object detection model meets one or more confidence criteria.

12. The computer-implemented method of claim 1, further comprising:

obtaining, by the one or more computing devices, data descriptive of a plurality of first machine-learned object detection models that are trained based on the first training data with different settings to determine one or more shape-level labels corresponding to the target category for one or more images;

determining, by the one or more computing devices, one or more shape-level labels corresponding to the target category for the one or more second images based on a consensus of the plurality of machine-learned object detection models.

13. The computer-implemented method of claim 1, wherein the one or more second images are image frames from a video.

14. The computer-implemented method of claim 1, wherein the one or more first images are obtained from a user and wherein the computer-implemented method is performed as a service by a model customization platform.

15. A non-transitory computer-readable media that stores a machine-learned object detection model, wherein the machine-learned object detection model has a detection portion that comprises:

a first classification head that is configured to generate a first classification output, wherein the first classification head has been trained based on a first set of images with groundtruth shape-level labels;

a first shape regression head that has been trained based on the first set of images with groundtruth shape-level labels; and a second, different classification head that is configured to generate a second, different classification output, wherein the second classification head has been trained based on a second set of images with mined shape-level labels;

wherein the mined shape-level labels were generated based on first classification outputs generated by the first classification head for the second set of images.

16. The non-transitory computer-readable media of claim 15, wherein the second classification head of the detection portion is trained based on both the first set of images with groundtruth shape-level labels and the second set of images with mined shape-level labels.

17. The non-transitory computer-readable media of claim 15, wherein the machine-learned object detection model has a region proposal portion that comprises:

a first classification head that is trained based on the first set of images with groundtruth shape-level labels;

a first shape regression head that is trained based on the first set of images with groundtruth shape-level labels; and a second classification head that is trained based on the second set of images with mined shape-level labels.

18. The non-transitory computer-readable media of claim 17, wherein the second classification head of the region proposal portion is trained based on first set of images with groundtruth shape-level labels and the second set of images with mined shape-level labels.

19. A computer system, comprising:

one or more processors; and one or more non-transitory computer-readable media that, when executed by the one or more processors, cause the computer system to perform operations for training a target machine-learned object detection model to determine shape-level labels corresponding to a target category, the target machine-learned object detection model including a feature extraction portion that generates a feature representation from an input image and a plurality of classification heads that generate respective classification outputs based on the feature representation, wherein the operations comprise:

training a first classification head and the feature extraction portion of the target machine-learned object detection model based at least in part on first training data that comprises shape-level label data corresponding to the target category; and training a second classification head of the target machine-learned object detection model and the feature extraction portion based at least in part on a loss that describes a difference between the classification output of the second classification head and a source classification output generated by a source machine-learned object detection model that is trained to determine one or more shape-level labels corresponding to a source category that is different from the target category.

20. The computer system of claim 19, wherein the operations further comprise:

using the first classification head and the feature extraction portion of the target machine-learned object detection model to generate mined training data comprising shape-level label data for images that previously had only image-level label data; and training a third classification head and the feature extraction portion of the target machine-learned object detection model based at least in part on the mined training data.

* * * * *